(12) United States Patent
Huber

(10) Patent No.: US 9,010,363 B2
(45) Date of Patent: Apr. 21, 2015

(54) DRAIN VALVE

(71) Applicant: Kevin Huber, Tacoma, WA (US)

(72) Inventor: Kevin Huber, Tacoma, WA (US)

(73) Assignee: The RectorSeal Corporation, Houston, TX (US)

( * ) Notice: Subject to any disclaimer, the term of this patent is extended or adjusted under 35 U.S.C. 154(b) by 0 days.

(21) Appl. No.: 14/210,103

(22) Filed: Mar. 13, 2014

(65) Prior Publication Data

US 2014/0373943 A1 Dec. 25, 2014

Related U.S. Application Data

(63) Continuation-in-part of application No. 14/082,018, filed on Nov. 15, 2013.

(60) Provisional application No. 61/878,349, filed on Sep. 16, 2013, provisional application No. 61/838,826, filed on Jun. 24, 2013.

(51) Int. Cl.
*F16K 15/03* (2006.01)
*E03F 5/04* (2006.01)

(52) U.S. Cl.
CPC .................................. *E03F 5/0407* (2013.01)

(58) Field of Classification Search
USPC ............. 137/512.1, 512.3, 513.3, 513.7, 527, 137/527.6, 852, 861; 4/682, 688
See application file for complete search history.

(56) References Cited

U.S. PATENT DOCUMENTS

| 155,669 A | 10/1874 | Painter |
| 171,817 A | 1/1876 | Kahl |
| 194,329 A | 8/1877 | Buhrer |
| 555,588 A | 3/1896 | Spencer |
| 803,979 A | 11/1905 | Bonnell |
| 1,137,516 A | 4/1915 | Moon |
| 1,720,819 A | 7/1929 | Cohen |
| 1,749,098 A * | 3/1930 | Boosey ...................... 137/614.2 |
| 1,771,770 A | 7/1930 | Bruno |

(Continued)

FOREIGN PATENT DOCUMENTS

| CH | 313441 A | 4/1956 |
| DE | 101 10 525 | 9/2002 |

(Continued)

OTHER PUBLICATIONS

U.S. Appl. No. 13/362,221, including its prosecution history, the cited references, and the Office Actions therein., Aug. 2, 2012, Huber.

(Continued)

*Primary Examiner* — Kevin Lee
*Assistant Examiner* — P. Macade Nichols
(74) *Attorney, Agent, or Firm* — Knobbe, Martens, Olson & Bear, LLP.

(57) ABSTRACT

A drain valve allows for drainage of fluids while preventing backflow of gases from a drainage system through the drain valve. A drain valve can have a first, sealed position in which a component of the valve seals an opening through the valve and a second, open position in which the component of the valve is separated from the opening to allow a fluid to drain through the valve. When the fluid has drained through, the component of the valve can return to the closed position. The valve can include a pressure relief conduit to help equalize pressure across the valve and permit unrestrained draining of fluid through the valve.

30 Claims, 10 Drawing Sheets

(56) References Cited

U.S. PATENT DOCUMENTS

| | | |
|---|---|---|
| 1,867,478 A | 7/1932 | Stelzner |
| 1,948,220 A | 2/1934 | Kennedy |
| 2,049,340 A | 7/1936 | Van Der Horst et al. |
| 2,132,636 A * | 10/1938 | Maahs .......................... 285/208 |
| 2,211,212 A | 8/1940 | Langdon |
| 2,270,737 A | 1/1942 | Langdon |
| 2,279,257 A | 4/1942 | Svirsky |
| 2,292,003 A | 8/1942 | Yant et al. |
| 2,299,116 A | 10/1942 | Svirsky |
| 2,299,434 A | 10/1942 | Svirsky |
| 2,322,631 A | 6/1943 | Groeniger |
| 2,348,097 A | 5/1944 | Smith |
| 2,369,939 A | 2/1945 | Betts |
| 2,371,449 A | 3/1945 | Langdon |
| 2,516,578 A | 7/1950 | Kreiner |
| 2,524,764 A | 10/1950 | Burke |
| 2,562,533 A | 7/1951 | Dunlap |
| 2,578,590 A * | 12/1951 | Perrault ..................... 137/493.5 |
| 2,579,855 A | 12/1951 | Pockel et al. |
| 2,594,318 A | 4/1952 | Langdon |
| 2,596,182 A | 5/1952 | Sosaya |
| 2,598,002 A | 5/1952 | Langdon |
| 2,629,393 A | 2/1953 | Langdon |
| 2,646,063 A | 7/1953 | Hayes |
| 2,655,178 A | 10/1953 | Sarosdy |
| 2,675,823 A | 4/1954 | Langdon |
| 2,725,075 A | 11/1955 | Irgens |
| 2,777,464 A | 1/1957 | Mosely |
| 2,787,376 A | 4/1957 | Coulson |
| 2,912,999 A | 11/1959 | Kersh |
| 2,913,000 A | 11/1959 | Roberts |
| 2,922,380 A | 1/1960 | Pedlow, Jr. |
| 2,927,609 A | 3/1960 | Vanderlans |
| 2,936,779 A | 5/1960 | Kindred |
| 2,997,050 A | 8/1961 | Ferguson |
| 3,047,013 A | 7/1962 | Baumbach |
| 3,059,637 A | 10/1962 | Senne |
| 3,060,882 A | 10/1962 | Peters et al. |
| 3,091,259 A | 5/1963 | Alessio |
| 3,107,687 A | 10/1963 | Howe |
| 3,116,751 A | 1/1964 | Hamilton |
| 3,118,468 A | 1/1964 | Bochan |
| 3,132,685 A | 5/1964 | McKinnon |
| 3,154,106 A | 10/1964 | Nooy |
| 3,228,418 A | 1/1966 | Rosback et al. |
| 3,241,571 A | 3/1966 | Garcia |
| 3,268,018 A | 8/1966 | Neilson |
| 3,312,237 A | 4/1967 | Mon et al. |
| 3,319,268 A | 5/1967 | Blumenkranz |
| 3,327,379 A | 6/1967 | Clements |
| 3,335,741 A | 8/1967 | Liljendahl |
| 3,354,903 A | 11/1967 | Caruso |
| 3,392,409 A | 7/1968 | Politz |
| 3,442,295 A | 5/1969 | Ver Nooy |
| 3,448,766 A | 6/1969 | Schule |
| 3,457,959 A | 7/1969 | Cooper |
| 3,463,189 A | 8/1969 | Fitzpatrick |
| 3,467,271 A | 9/1969 | Kaiser et al. |
| 3,519,012 A | 7/1970 | Van Patten |
| 3,542,057 A | 11/1970 | Staiano |
| 3,605,132 A | 9/1971 | Lineback |
| 3,610,270 A | 10/1971 | Attle |
| 3,707,986 A | 1/1973 | Breen |
| 3,712,115 A | 1/1973 | Miller |
| 3,730,218 A | 5/1973 | Rydberg |
| 3,762,437 A | 10/1973 | King, Sr. |
| 3,766,947 A | 10/1973 | Osburn |
| 3,768,505 A | 10/1973 | Benke |
| 3,775,780 A | 12/1973 | McEwen |
| 3,822,720 A | 7/1974 | Souza |
| 3,858,604 A | 1/1975 | Bender et al. |
| 3,911,949 A | 10/1975 | Hilden et al. |
| 3,919,880 A | 11/1975 | Seyd et al. |
| 3,941,156 A | 3/1976 | Metzger |
| 3,952,340 A | 4/1976 | Cuschera |
| 3,969,847 A | 7/1976 | Campagna et al. |
| 3,990,439 A | 11/1976 | Klinger |
| 4,009,366 A | 2/1977 | Danell |
| 4,040,450 A | 8/1977 | Boundy |
| 4,052,759 A | 10/1977 | Hill |
| 4,054,152 A | 10/1977 | Ito et al. |
| 4,064,912 A | 12/1977 | Petrone |
| 4,086,668 A | 5/1978 | Tubbs |
| 4,088,149 A | 5/1978 | Logsdon |
| 4,098,287 A | 7/1978 | Baumbach |
| 4,132,111 A | 1/1979 | Hasha |
| 4,132,241 A | 1/1979 | Iannelli |
| 4,142,371 A | 3/1979 | Mayfield |
| 4,163,509 A | 8/1979 | Amneus |
| 4,168,621 A | 9/1979 | Kreitenberg |
| 4,175,592 A | 11/1979 | Coone |
| 4,180,875 A | 1/1980 | Wilson |
| 4,192,339 A | 3/1980 | Fisher |
| 4,194,252 A | 3/1980 | Tsuei |
| 4,194,721 A | 3/1980 | Nachtigahl |
| 4,202,377 A | 5/1980 | Harrison |
| 4,203,473 A | 5/1980 | Roberson, Sr. |
| 4,212,486 A | 7/1980 | Logsdon |
| 4,222,407 A | 9/1980 | Ruschke et al. |
| 4,232,704 A | 11/1980 | Becker et al. |
| 4,232,706 A | 11/1980 | Ericson |
| 4,289,166 A | 9/1981 | Haines |
| 4,296,778 A | 10/1981 | Anderson |
| 4,306,447 A | 12/1981 | Franks, Jr. |
| 4,376,597 A | 3/1983 | Britton et al. |
| 4,406,480 A | 9/1983 | Izzi |
| 4,407,171 A | 10/1983 | Hasha et al. |
| 4,416,308 A | 11/1983 | Bower |
| 4,423,526 A | 1/1984 | Izzi, Sr. |
| 4,429,568 A | 2/1984 | Sullivan |
| 4,460,019 A | 7/1984 | Condon |
| 4,494,575 A | 1/1985 | Gladstone |
| 4,535,807 A | 8/1985 | Ericson |
| 4,542,642 A | 9/1985 | Tagliarino |
| 4,594,739 A | 6/1986 | Watts et al. |
| 4,602,504 A | 7/1986 | Barber |
| 4,607,664 A | 8/1986 | Carney et al. |
| 4,610,246 A | 9/1986 | Delphia |
| 4,624,131 A | 11/1986 | Holm et al. |
| 4,632,151 A | 12/1986 | Glover |
| 4,658,861 A | 4/1987 | Roberson, Sr. |
| 4,669,131 A | 6/1987 | Barlow |
| 4,706,482 A | 11/1987 | Barber |
| 4,712,574 A | 12/1987 | Perrott |
| 4,729,401 A | 3/1988 | Raines |
| 4,744,109 A | 5/1988 | Yuill |
| 4,756,982 A | 7/1988 | McCartney, Jr. |
| 4,762,149 A | 8/1988 | Pickl, Jr. |
| 4,763,510 A | 8/1988 | Palmer |
| 4,780,915 A | 11/1988 | Cuschera |
| 4,821,559 A | 4/1989 | Purpora |
| 4,823,411 A | 4/1989 | Nettel |
| 4,827,539 A | 5/1989 | Kiziah |
| 4,836,151 A | 6/1989 | Litjens et al. |
| 4,838,262 A | 6/1989 | Katz |
| 4,848,155 A | 7/1989 | Huber |
| 4,870,992 A | 10/1989 | Irwin et al. |
| 4,873,730 A | 10/1989 | Cuschera |
| 4,887,646 A | 12/1989 | Groves |
| 4,890,483 A | 1/1990 | Vetter |
| 4,936,338 A | 6/1990 | Fonoimoana |
| 4,936,350 A | 6/1990 | Huber |
| 5,005,603 A | 4/1991 | Amundson et al. |
| 5,014,739 A | 5/1991 | Csaszar |
| 5,033,510 A | 7/1991 | Huber |
| 5,070,896 A | 12/1991 | Warren |
| 5,076,095 A | 12/1991 | Erhardt |
| 5,099,887 A | 3/1992 | Hooper |
| 5,115,554 A | 5/1992 | Fell, Sr. |
| 5,159,953 A | 11/1992 | Sato et al. |
| 5,163,480 A | 11/1992 | Huber |
| 5,181,543 A | 1/1993 | Hendzel |
| 5,277,171 A | 1/1994 | Lannes |
| 5,287,730 A | 2/1994 | Condon |

(56) References Cited

U.S. PATENT DOCUMENTS

| | | | |
|---|---|---|---|
| 5,297,581 A | 3/1994 | Godfrey | |
| 5,301,707 A | 4/1994 | Hofsteenge | |
| 5,323,641 A | 6/1994 | Tolliver et al. | |
| 5,323,804 A | 6/1994 | Lin | |
| 5,325,885 A | 7/1994 | Ivan et al. | |
| 5,330,437 A | 7/1994 | Durman | |
| 5,377,361 A | 1/1995 | Piskula | |
| 5,419,359 A | 5/1995 | Kor | |
| 5,419,366 A | 5/1995 | Johnston | |
| 5,507,501 A | 4/1996 | Palmer | |
| 5,518,026 A | 5/1996 | Benjey | |
| 5,601,112 A | 2/1997 | Sekiya et al. | |
| 5,606,995 A | 3/1997 | Raftis | |
| 5,623,971 A | 4/1997 | Foernzler | |
| 5,662,138 A | 9/1997 | Wang | |
| 5,709,309 A | 1/1998 | Gallagher et al. | |
| 5,727,593 A | 3/1998 | Duer | |
| 5,740,830 A | 4/1998 | Mankins | |
| 5,797,426 A | 8/1998 | Powell | |
| 5,844,127 A | 12/1998 | Berube et al. | |
| 5,927,762 A | 7/1999 | Webb | |
| 5,996,134 A | 12/1999 | Senninger | |
| 6,032,515 A | 3/2000 | Huber | |
| 6,082,183 A | 7/2000 | Huber | |
| 6,085,362 A | 7/2000 | Huber | |
| 6,085,363 A | 7/2000 | Huber | |
| 6,209,584 B1 | 4/2001 | Huber | |
| 6,234,195 B1 * | 5/2001 | Kippe et al. | 137/493.3 |
| 6,237,625 B1 | 5/2001 | Randolph | |
| 6,273,124 B1 | 8/2001 | Huber et al. | |
| 6,318,397 B1 | 11/2001 | Huber et al. | |
| 6,367,505 B1 | 4/2002 | Raftis et al. | |
| 6,626,201 B1 | 9/2003 | Kim | |
| 6,719,003 B2 | 4/2004 | Schroeder et al. | |
| 6,719,004 B2 | 4/2004 | Huber et al. | |
| 6,827,105 B1 | 12/2004 | Marble et al. | |
| 7,509,978 B1 | 3/2009 | Currid | |
| 7,900,288 B2 | 3/2011 | Fima | |
| 8,201,576 B2 | 6/2012 | Klein | |
| 2012/0152388 A1 | 6/2012 | Stanaland | |

FOREIGN PATENT DOCUMENTS

| | | |
|---|---|---|
| IT | 495000 A | 6/1954 |
| WO | WO 96/19620 A1 | 6/1996 |
| WO | WO 2010/088734 | 8/2010 |
| WO | WO 2011/047437 | 4/2011 |

OTHER PUBLICATIONS

U.S. Appl. No. 13/362,900, including its prosecution history, the cited references, and the Office Actions therein., Feb. 7, 2012, Huber.

U.S. Appl. No. 14/082,018, including its prosecution history, the cited references, and the Office Actions therein., Not yet published, Huber.

Oct. 10, 2014 Invitation to pay additional search fees and partial international search results for International Application No. PCT/US2014/043488 filed on Jun. 20, 2014.

* cited by examiner

DRAIN VALVE

CROSS-REFERENCE TO RELATED APPLICATIONS

Any and all applications for which a foreign or domestic priority claim is identified in the Application Data Sheet as filed with the present application, are hereby incorporated by reference in their entirety under 37 CFR 1.57.

BACKGROUND

1. Field of the Disclosure

The present disclosure relates in general to valves that can be used to provide one way flow of fluids. Such valves can be used, for example, in floor drains, such as valves useful in drains for buildings, floors, basements, exterior paved areas or other areas that require drainage, as well as for urinals and other waste handling devices connected to a sewer or drain conduit. Such valves can also be used in building vents, such as roof vents or tubing or piping used as part of a heating, ventilation, air conditioning, and/or refrigeration system.

2. Description of the Related Art

Floor drains are frequently used with a trap that catches a volume of water in such a way that direct access for gas from the drain system to the area above the floor drain is blocked but that allows passage of the water. Floor drains are available in many shapes and are used in laundry rooms, bathrooms, shower spaces etc. for the draining of water. Traditionally, U-shaped or "gooseneck" traps have been used in the plumbing industry to prevent backflow of harmful or undesirable sewer or pipe gases into buildings while permitting drainage of unwanted liquid from floors and other generally horizontal surfaces. Such traps operate by leaving a small quantity of fluid within the lower portion of a U-shaped trap section to act as a gas barrier. In many applications, however, particularly where access is difficult or where drainage is infrequent, gooseneck traps are not optimal due to insufficient space to install and to inaccessability. Fluid in gooseneck trap may evaporate from the trap, permitting free flow of obnoxious gasses through the drain, insects may breed in the fluid, or in some instances the fluids may harden so as to actually block or restrict flow through the drain.

Drains with barrier seals have been developed to overcome some of the shortcomings of the gooseneck traps. However, barrier seal type valves with further improvement in their effectiveness, manufacturability, reliability, and ease of use are desirable.

SUMMARY OF THE DISCLOSURE

Various valve embodiments described herein are configured to provide a valve that prevents or substantially prevents the backflow of gases in one direction while permitting liquids or gases to flow through the valves in a different direction. It is understood that various embodiments described herein can be used as drain valves that prevent or substantially prevent backflow of large quantities of gases from the drain or sewer while permitting liquids to flow downwardly into the drain or sewer. It is further understood that various embodiments can be used in other applications, such as for use as valves in vents in or on buildings as part of a heating, ventilation, air conditioning, and/or refrigeration system for the building, recreational vehicle (e.g., RV) and/or motor homes.

In some embodiments, valves described herein for use as drain valves can be configured to comply with all or some of various applicable standards, such as the American Society of Sanitary Engineering (ASSE) Standard #1072-2007 approved Sep. 19, 2007, which is hereby incorporated by reference herein in its entirety. Portions of the ASSE Standard #1072-2007 that may be complied with include, but are not limited to, standards for flow capacity, function, evaporation, and/or obstruction.

Various drain valve embodiments described herein are configured to provide a drain valve that permits equalization of pressure above and below the valve so that even small quantities of water upon the upper surface of the valve will cause it to open and drain.

Various drain valve embodiments described herein are configured to provide a drain valve that includes a pressure equalization conduit with a ball valve, said conduit extending from below to above the drain valve, the ball valve structure being used to close the pressure relieving conduit for pressure testing of the drain or sewer below the valve.

Various drain valve embodiments described herein are configured to provide improved effectiveness, manufacturability, simplicity and reliability for drain valves used in draining floor surfaces and the like.

Various drain valve embodiments described herein are configured to provide a valve housing having the upper portion thereof formed to permit expansion outwardly into engagement with the interior of the floor drain housing to secure the valve housing in place and prevent elevated pressures beneath the valve housing from dislodging the valve housing from its operative position.

Various drain valve embodiments described herein are configured to provide a one-way valve that opens to allow fluid flow under a minimum pressure and that also opens sufficiently to allow for a large fluid flow rate. This is an improvement over many known devices configured to open easily, but that are not able to sustain desired flow rates. Various embodiments described herein are configured to provide a substantially unimpeded flow path through a drain valve when the drain valve is in an open position to allow for greater flow rates through the valve and/or to allow debris to pass through the valve.

To minimize the limitations found in the prior art, and to minimize other limitations that will be apparent upon the reading of the specifications, one preferred embodiment of the present disclosure provides a valve used in drains for building floors, basements, and exterior paved areas to permit backflow of small amounts of backflow gases to prevent excess pressure on the bottom side of a drain valve flapper. In a second embodiment, the valve may close and prevent backflow of fluids in both normal operations and in pressure testing of the downstream drain conduit. To prevent the valve structure from being forced upwardly by pressure below the valve a securing and sealing system such as a rotatable ring threaded to expand the upper zone of the valve body into contact with the inner wall of a drain conduit is provided to cause the upper portion of the drain valve body to be expanded into secure frictional engagement with the drain housing in which the valve is installed. Other means to hold the valve body in place are contemplated as well. In certain arrangements, a gasket surrounding the drain valve body is provided to securely seal the drain valve body within the drain housing. In some arrangements, the drain body can be secured with an adhesive (e.g., glue) to the drain housing. Various drain valves described herein permit pressure testing of downstream conduits without the subsequent removal of the solid plug used for pressure testing. The drain valves permit equalization of pressure above and below the flapper when the valve is used for subsequent drainage of the floor or other area. Finally, the drain valves would provide improved effectiveness, manufacturability, simplicity and reliability.

Various embodiments of drain valves described herein include check valves that allow for drainage of fluids while preventing backflow of fluids (including gases) from a drainage system through the drain valve. In some embodiments, a check valve can have a first, sealed position in which a component of the check valve seals an opening through the valve and a second, open position in which the component of the check valve (such as a flapper) is separated from the opening to allow a fluid to drain through the valve. When the fluid has drained through, the component of the valve can return to the closed position. In some embodiments, the valve can be configured to resist back pressure in the system, such as during storm events or to allow for back pressure testing of the drain system downstream of the valve for leaks and other anomalies. Thus, back pressure testing can occur without having to remove the valve and block the drain with a separate device, as is typically done.

In some embodiments, the valve can include a closure, preferably light in weight, positioned at the top of the conduit connecting a zone below a flapper (or other valve element) with a zone above the flapper. The closure is raised by a very small amount of pressure and permits gas to flow from the area below the flapper to the area above the flapper. This embodiment is generally used in situations where the back pressure needs to be equalized across the flapper so that the flapper will open whenever water, even in small quantities, flows into the valve. In some embodiments, the valve may not provide the capability of back pressure testing, such as for testing the sewer or pipe below the valve.

In some embodiments, the valve can be functionally similar to the prior described embodiment, but can incorporate a ball valve at the bottom of the conduit. The ball valve may be closed by the presence of water (or substantial gas flow) flowing backward, such as from the water filled "P trap" used in drain or sewer systems. The ball valve, which is positioned below the flapper in the conduit, can connect the zone of the valve structure below the flapper with the zone of the valve structure above the flapper so that the valve may be sealed to back pressure, thereby permitting pressure testing of the sewer or piping below the valve. It may not be necessary to remove the ball valve structure after the installation of the flapper valve, since it can operate in the same fashion as the prior described embodiments so long as the ball is not raised by the presence of water below the flapper.

In some embodiments, a drain valve flapper can include an elastomeric hinge that connects a mounting structure with the flapper. The elastomeric hinge urges the flapper into a normally closed position against the flapper seat while permitting the flapper to open when water flows down on the upper surface of the flapper. The flapper is positioned, using a keeper which is preferably removable, in a flapper mount. The flapper mount is positioned at an angle to bias the elastomeric hinge upwardly so that the flapper is held against the flapper seat when at rest without downwardly moving water. The flapper mount preferably holds the flapper at an angle relative to the horizontal.

In various embodiments, drain valves as described herein may utilize an expansion device, such as a securing and sealing ring, preferably at the upper portion of the valve body to secure the valve body in operative position within the drain conduit. In certain arrangements, water can flow through an opening in the expansion device and/or the expansion device can be partially closed with passages for water to flow through. An alternative securing and sealing structure contemplated herein is a gasket structure having an inflatable void extending partially or completely around the outer wall of the valve body. Inflation of the gasket structure would force the periphery of the gasket into a secure sealing against the interior of the drain conduit and would prevent the valve body from being dislodged whenever pressure is applied in the conduit downstream of the valve body. Other securing and/or sealing structures can be used, including snap locks, such as bale-and-gasket snap locks similar to those used on mason jars, inflatable sealing locks, and multi-layered locks with two outer rigid layers that can compress a resilient middle layer such that it expands outward to lock. In some embodiments, a securing and/or sealing structure can be separate from the valve body.

In certain conditions of operation, back pressure in the system may hinder the opening of a check valve. In some embodiments, it can be desirable to provide some form of pressure equalization in order to permit unrestricted opening of the valve. Such a form of pressure equalization can, during normal operation or the check valve, help equalize pressure across the valve (e.g., equalize pressure on both sides of a valve flapper) when necessary but still prevent backflow of undesirable gases once the pressure has been equalized. By helping equalize pressure, normal operation of the check valve can be ensured. Additionally, equalizing pressure can ensure that the check valve can open at pressures consistent with regulatory standards.

In some embodiments, inclusion of a pressure equalization system can allow backflow of fluids in addition to allowing for the release of gases needed to equalize pressure. Thus, in some embodiments, where a system design is desired to include prevention of backflow during high pressure events, such as to perform back pressure testing, a drain valve can include a pressure equalization valve or system and also include an additional valve to block backflow during high pressure events.

In some embodiments, to prevent a drain valve structure from being forced upwardly by pressure below the valve a securing and sealing system such as a rotatable ring threaded to expand the upper zone of the valve body into contact with the inner wall of a drain conduit is provided. The ring can cause the upper portion of the drain valve body to be expanded into secure frictional engagement with the drain housing in which the valve is installed. Other means to hold the valve body in place are contemplated as well. In some embodiments, a gasket surrounding the drain valve body is provided to securely seal the drain valve body within a drain housing.

In some embodiments, a drain valve allows for the equalization of pressure above and below the flapper of a check valve without providing the ability to block backflow of high pressures to thereby allow for pressure testing the sewer or pipe below the valve. The drain valve can include a light weight closure positioned in a pressure relief conduit connecting a zone below the flapper with a zone above the flapper. The closure can be raised by a very small amount of pressure and permit gas to flow from the area below the flapper to the area above the flapper. Such embodiments are generally used in situations in which the back pressure needs to be equalized across the flapper so that the flapper will open whenever fluid, even in small quantities, flows into the drain valve.

In some embodiments, a drain valve can prevent fluid backflow during normal conditions and during high pressure conditions, such as when testing back pressure in the system. In some embodiments, the drain valve can have just a flapper that operates as a check valve to permit fluid to flow through the valve in a first direction but not in an opposing direction. In some embodiments, the drain valve can have a pressure relief and also an additional valve to prevent fluid backflow during normal operating conditions and to permit pressure testing of the drain or sewer system beneath the drain valve. The additional valve can be, for example, a ball valve with a lightweight closure that houses a ball or a flapper valve in certain arrangements. The ball valve can be positioned in the pressure relief conduit and can be closed by the presence of a strong backflow pressure. The ball valve can connect the zone of the valve structure below the flapper with the zone of the valve structure above the flapper so that the valve may be sealed against high back pressures, thereby permitting pressure testing of the sewer or piping below the valve. At low back pressures, the ball valve can remain open and allow for pressure equalization.

In some embodiments, a drain valve flapper can include an elastomeric hinge that connects a mounting structure with the flapper. The elastomeric hinge can urge the flapper into a normally closed position against a flapper seat while permitting the flapper to open when fluid flows onto the upper surface of the flapper. The flapper can be secured to the flapper mount using a mounting bracket or clip. The flapper can be mounted at an angle to bias the elastomeric hinge upwardly so that the flapper is held against the flapper seat when at rest without downwardly moving water. The flapper mount preferably holds the flapper at an angle relative to the horizontal.

Various embodiments described herein may utilize an expansion device, such as a securing and sealing ring, to help secure the valve body in an operative position within the drain conduit. In some embodiments, a drain valve can include a gasket structure having an inflatable membrane extending partially or completely around the outer wall of the valve body. Inflation of the gasket structure can force the periphery of the membrane into a secure sealing position against the interior of the drain conduit and can prevent the valve body from being dislodged whenever pressure is applied in the conduit downstream of the valve body.

In some embodiments, a securing and/or sealing ring can be adapted for rotational installation in which a threaded exterior of the sealing ring engages and expands the upper portion of the valve body. The upper portion may be formed of elastomeric material or alternatively the rigid valve body may have the upper portion thereof slotted to permit outward expansion thereof into secure engagement with the drain conduit. This secure engagement with the floor drain housing prevents pressure beneath the valve body from ejecting the valve body upwardly from the floor drain housing. In some embodiments, the upper portion can be separate from a lower portion of the valve body.

In some embodiments, a securing and sealing ring can incorporate a tapered threaded portion which engages a threaded portion of the valve body to cause an upper portion of the valve body to expand when the ring is rotated. The securing and sealing means may be incorporated into the valve body exterior or may be a securing and sealing device which is separately placed into the drain conduit in structural contact with the valve body.

The preferred securing and sealing ring is adapted for rotational installation in which a threaded exterior of the sealing ring engages and expands the upper portion of the valve body. The upper portion may be formed of elastomeric material or alternatively the rigid valve body may have the upper portion thereof slotted to permit outward expansion thereof into secure engagement with the drain conduit. This secure engagement with the floor drain housing prevents pressure beneath the valve body from ejecting the valve body upwardly from the floor drain housing.

Various embodiments described herein provide a method of draining a floor or other area, which includes a pressure testing configuration, by preventing the backflow of fluid (gas or liquid) under pressure thereby permitting pressure testing of the conduit downstream of the drain valve. A securing and sealing means may be incorporated into the valve body exterior or may be a securing and sealing device which is separately placed into the drain conduit in structural contact with the valve body.

The present disclosure also provides a method of draining a floor while preventing the backflow of gas under pressure thereby permitting pressure testing of the conduit downstream of the valve. The method according to one embodiment includes the step of positioning a flapper within a cylindrical body such that a peripheral edge of the rigid flapper adjacent an inlet of the cylindrical body is resiliently and flexibly attached to the cylindrical body by a resilient hinge having an indexing embossment fitting into an indexing groove for positive placement of the flapper. The indexing embossment also serves to distribute forces exerted by back pressure upon the flapper thereby maintaining the flapper in its position when sealed against a valve seat. A peripheral edge of the rigid flapper adjacent the outlet of the cylindrical body is urged into sealing relationship with a sealing surface on a valve seat but is free to deflect towards the outlet to open the valve permitting downward flow of liquids therethrough. In addition the valve configuration is adapted to resist back pressure from the drain so that the drain may be tested for leakage. The features of the present disclosure are described in greater detail below.

In various embodiments, a check valve can include a cylindrical body, including an inlet end and an opposed outlet end; a resilient flapper mount connected to an inside surface of the cylindrical body, said flapper mount having an indexing groove extending across a substantial portion of said mount; a flapper stop positioned on the inside surface of the cylindrical body between the flapper mount and the outlet end of the cylindrical body; and a flapper connected to said flapper mount, said flapper having a mounting flange with an indexing ridge for insertion into said indexing groove, said flapper being rotatable upon an elastomeric hinge from a first closed position engaged with the flapper stop to allow liquid that enters the inlet to exit the check valve through the outlet and when in the closed position prevents backflow of gases.

In various embodiments, a check valve assembly can include a drain basin configured to be inserted into a floor, the drain basin including an upper end and a lower end, wherein the area of the upper end is greater than the area of the lower end. The assembly can include a check valve configured to be secured between the upper and lower ends of the drain basin, the check valve being configured to be inserted and removed from the drain basin from the upper end of the drain basin. In some embodiments, the check valve can including a cylindrical body, including an inlet end and an opposed outlet end, a flapper seat, and a relatively rigid flapper having a mounting tab with indexing ridge and resilient hinge. In some embodiments, the check valve can be positioned below the assembly. The flapper can be mounted upon the flapper mount and positioned within the cylindrical body at an angle and urged into sealing contact with the seat by the resilient hinge. A portion of an upper periphery edge of the flapper can be connected to the cylindrical body, and a portion of a lower peripheral edge can be configured to deflect to allow fluid to pass through the cylindrical body of the check valve. Liquids may pass downwardly through the check valve and gases from below the check valve are prevented from upward movement.

In various embodiments, a floor drain valve can include a substantially cylindrical outer housing configured to fit within a drain conduit, and a substantially cylindrical inner housing connected with the outer housing. The valve can include a flapper seat having an aperture connected to an inner surface of the inner housing, a flapper positioned at the aperture, and a flapper mount having an aperture configured to receive an alignment pin and hold the flapper against the flapper seat. A conduit can attach to the inner housing and extend from an area below the flapper to an area above the flapper. A closure can be positioned at the top of the conduit, the closer being raised under pressure to permit gas to flow from the area below the flapper to the area above the flapper. A shield can connect to the inner housing and be adapted to cover the closure. An elastomeric hinge can connect the shield with the flapper seat and allow the flapper to pivot, thereby allowing fluid to pass through the inner housing. The closure can also be configured to provide equalization of pressure above and below the flapper to thereby allow the flapper to open when fluid flows into the valve.

In various embodiments, a floor drain valve can include a drain valve housing configured to fit within a drain conduit, the drain valve housing including an inlet, an outlet, and a valve seat. A flapper can be mounted within the housing and have a first side facing a first side of the valve and a second side facing a second side of the valve, the flapper biased toward a closed position in which the first side of a sealing portion of the flapper engages with the valve seat to thereby block at least a portion of backflow through the drain housing. The flapper can also be configured such that a pressure on the first side of the flapper moves the flapper to an open position in which fluid can flow past the flapper. The drain valve can also include a pressure equalization conduit fluidly connecting a first side of the drain valve on the first side of the flapper with a second side of the drain valve on the second side of the flapper. A valve member can be within the pressure equalization conduit, the valve member configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve.

In various embodiments, a floor drain valve can include a drain valve housing having an inlet and an outlet; a one way valve positioned within the drain valve housing, the one way valve configured to restrict backflow through the drain housing while allowing fluid to drain through the drain housing from the inlet to the outlet in a first direction; a pressure equalization conduit fluidly connecting a first side of the one way valve a second side of one way valve; and a valve member configured to move from a closed position that restricts fluid transfer between the first and second sides of the one way valve to an open position when a pressure on the second side of the one way valve exceeds a first defined pressure, thereby allowing the pressure on the second side of the one way valve to bleed into the first side of the one way valve.

In various embodiments, a floor drain valve can include a drain valve housing configured to fit within a drain conduit, the drain valve housing including an inlet, an outlet, a valve seat, and a flapper mount having an indexing indentation. The flapper can include a sealing section, an attachment section, and a resilient hinge between the sealing section and the attachment section. The attachment section can include an indexing protrusion configured to couple with the indexing indentation to thereby align the flapper such that the sealing section engages the valve seat when the flapper is in a closed position to substantially prevent backflow of fluids through the drain valve. The resilient hinge can bias the flapper toward the closed position, and the hinge can be configured such that a fluid passing through the inlet and applying a pressure on the flapper moves the flapper from the closed position to an open position in which the fluid can pass by the flapper and through the outlet.

In various embodiments, an expandable floor drain valve assembly can include a drain valve housing configured to fit within a drain conduit, the drain valve housing including an upper section defining an inlet, and a lower section defining an outlet. The upper section can include a plurality of flexible panels separated by slits, and at least a portion of the flexible panels can have internal threading. A valve member can be positioned within the drain valve housing and can be configured to allow fluid to flow through the drain valve housing from the inlet to the outlet but substantially block fluid from flowing through the drain valve housing from the outlet to the inlet. The assembly can also include an expansion ring having external threading, the expansion ring configured to be screwed into the upper section of the drain valve housing and to drive the flexible panels outward into engagement with the drain conduit as the expansion ring is screwed into the upper section to thereby tighten the drain valve within the drain conduit.

In various embodiments, a method of installing a drain valve into a drain conduit having a strainer mount can include providing a drain valve have a valve body and a flexible exterior gasket, wherein the gasket in an equilibrium position has a width greater than an inner diameter of the strainer mount and the valve body has a width smaller than the inner diameter of the strainer mount; deforming the gasket into a configuration sized to fit through the strainer mount of the drain conduit; inserting the gasket through the strainer mount and into said conduit; inserting the valve body through the strainer mount; positioning the valve body in the gasket; and positioning the valve body and gasket into an operational position within the drain conduit.

In various embodiments, a floor drain valve can include a drain valve housing comprising an inlet and an outlet. A one way valve can be positioned within the drain valve housing. The one way valve can be configured to restrict backflow through a flow channel of the drain housing from a second side of the one way valve to a first side of the one way valve while allowing fluid to drain through the flow channel of the drain housing from the first side of the one way valve to the second side of the one way valve. A pressure equalization conduit can fluidly connect the first side of the one way valve to the second side of one way valve. A valve member can move from a closed position that restricts fluid transfer through the pressure equalization conduit between the first and second sides of the one way valve to an open position when a pressure on the second side of the one way valve exceeds a first defined pressure, thereby allowing the pressure on the second side of the one way valve to bleed into the first side of the one way valve.

In various embodiments, a floor drain valve can include a drain valve housing configured to fit within a drain conduit. The drain valve housing can include an inlet, an outlet, a circumferential valve seat, and a flow channel passing through the valve and through the valve seat. A flapper is mounted within the housing and has a first side facing a first side of the valve and a second side facing a second side of the valve. The flapper is biased toward a closed position in which a sealing portion on the first side of the flapper engages with the valve seat to thereby block at least a portion of backflow through the flow channel. The flapper is configured such that a minimum pressure on the first side of the flapper moves the flapper to an open position in which fluid can flow through the flow channel. A pressure equalization conduit fluidly connects a first side of the drain valve on the first side of the flapper with a second side of the drain valve on the second side of the flapper. A valve member is within the pressure equalization conduit. The valve member is configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow. All of these embodiments are intended to be within the scope of the present disclosure. These and other embodiments will become readily apparent to those skilled in the art from the following detailed description of the preferred embodiments having reference to the attached figures, the invention not being limited to any particular preferred embodiment(s) disclosed or summary provided herein.

BRIEF DESCRIPTION OF THE DRAWINGS

Elements in the figures have not necessarily been drawn to scale in order to enhance their clarity and improve understanding of these various elements and embodiments described herein. Furthermore, elements that are known to be common and well understood to those in the industry are not depicted in order to provide a clear view of the various embodiments described herein, thus the drawings are generalized in form in the interest of clarity and conciseness.

DETAILED DESCRIPTION

In the following discussion that addresses a number of embodiments and applications, reference is made to the accompanying drawings that form a part hereof, and in which is shown by way of illustration specific embodiments in which the embodiments described herein may be practiced. It is to be understood that other embodiments may be utilized and changes may be made without departing from the scope of the disclosure.

Various inventive features are described below that can each be used independently of one another or in combination with other features. However, any single inventive feature may not address all of the problems discussed above or only address one of the problems discussed above. Further, one or more of the problems discussed above may not be fully addressed by the features of each embodiment described below.

Figure 1:
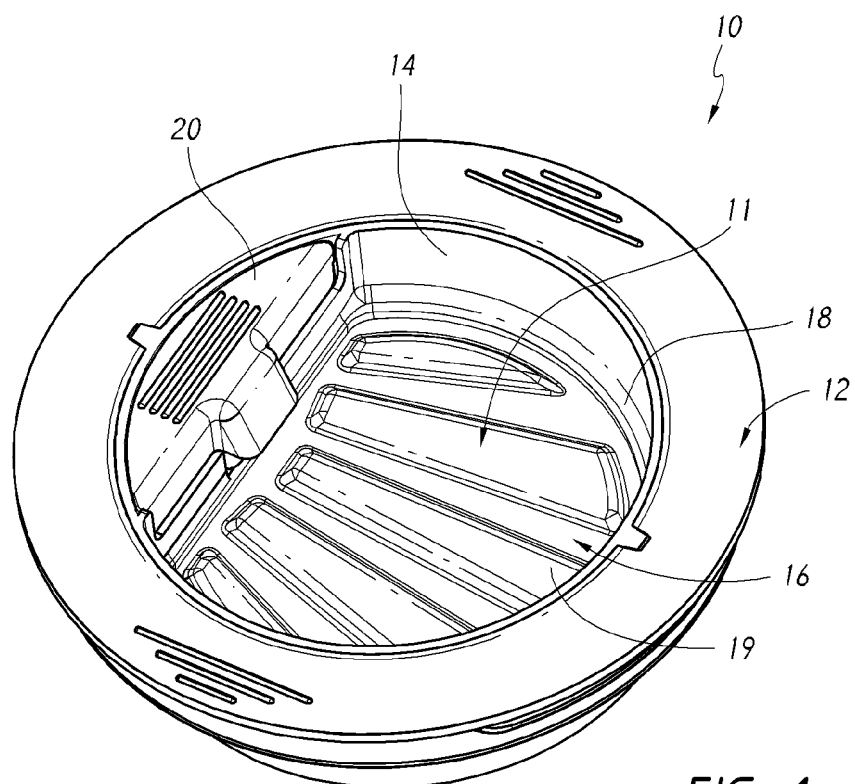
FIG. 1 illustrates a top perspective view of one embodiment of a drain valve.
Figure 2:
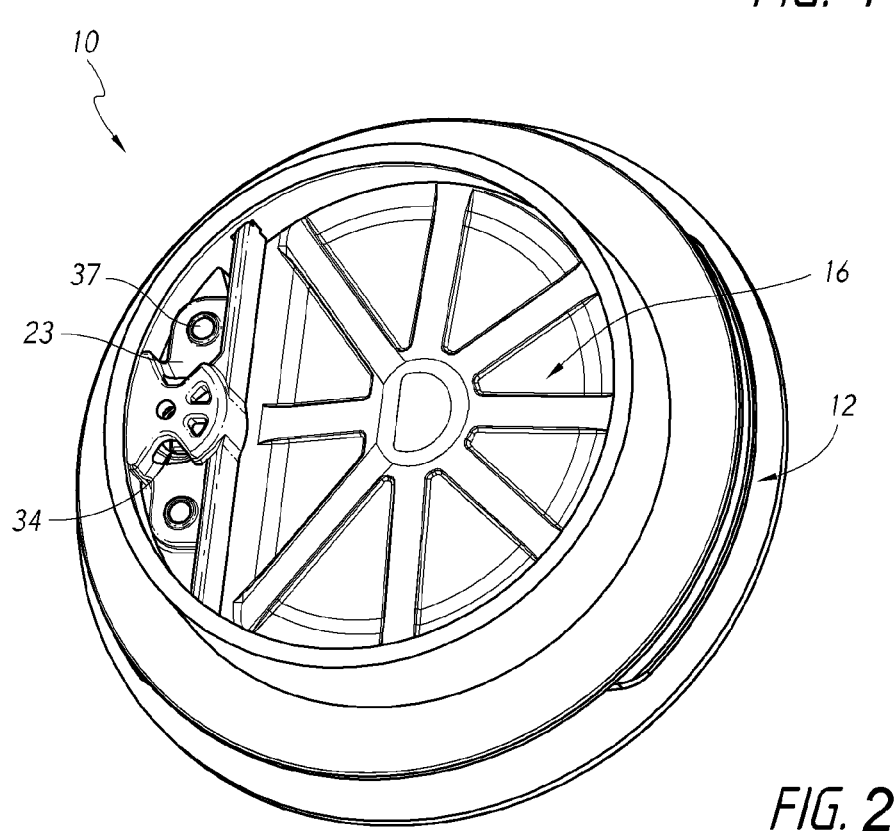
FIG. 2 illustrates a bottom perspective view of the drain valve of FIG. 1.

Referring to FIG. 1 and FIG. 2, a first embodiment of the floor drain valve 10 of the present disclosure is described. The floor drain valve 10 can include a gasket 12 configured to fit into a sealing relationship in a drain conduit and a housing 14 positioned within the gasket 12. In some embodiments, the housing can be generally cylindrical. In some embodiments, the housing can have an internal diameter that is wider at the top (e.g., at the inlet) than at the bottom (e.g., at the outlet). In some embodiments, the housing can have a generally constant internal diameter. In some embodiments, the internal diameter can have a non-circular shape (e.g., oval rectangular, square, etc.) that can also differ from the cross-sectional shape of the drain conduit in which the valve is placed. The housing can include a sealing seat, such as a flapper seat 18 (see also FIG. 3) that is connected to or formed as a part of housing 14 and a main flow channel 11. A one-way valve, such as a valve using a membrane or flapper 16, can be positioned within the housing and can be configured to engage and seal against the flapper seat 18 to prevent passage of fluids through the main flow channel 11. In some embodiments, described further below, a flapper 16 can include one or more ridges, ribs, or other structures 19 to increase the structural stability of the flapper. Although much of the description refers to flapper valves, it is understood that concepts described herein can be used with other types of valves, such as, for example, slit valves or duckbill valves.

With reference to FIG. 2, a flapper 16 can attach to a flapper mount (illustrated and described in more detail below) that can include one or more mounting projections 37 to help align the flapper 16. In some embodiments, a mounting clip 23 can be positioned to secure the flapper 16 in position. The flapper 16 is preferably biased upward into a closed position against a lower surface of the flapper seat 18. In some embodiments, the flapper 16 can include a resilient, elastomeric hinge (described and illustrated below) that can help bias the flapper 16 into the closed position. In the closed position, the flapper can resist or block backflow of fluid. Sufficient pressure above the flapper 16 can move the flapper 16 into an open position in which the flapper is separated or partially separated from the flapper seat 18, thereby allowing fluid to pass through the housing 14 and past the flapper 16. In some embodiments, the flapper in the open position may have only a portion of the flapper separated from the flapper seat. Preferably, the flapper can be opened to a position, such as when the flapper is opened to allow the maximum flow rate through the main flow channel 11, in which it is bent completely or mostly out of the way to create a substantially unimpeded path through the main flow channel 11. This can allow for greater maximum flows through the floor drain valve 10 and can also help allow debris or other detritus passing through the drain to pass through without catching and clogging.

In some embodiments, when the flapper 16 is opened to allow a maximum flow rate, the entire cross-sectional area of the main flow channel 11 is unimpeded. In some embodiments, when the flapper is opened to allow a maximum flow rate, no more than five percent of the cross-sectional area of the main flow channel is impeded. In some embodiments, when the flapper is opened to allow a maximum flow rate, no more than ten percent of the cross-sectional area of the main flow channel is impeded. In some embodiments, when the flapper is opened to allow a maximum flow rate, no more than thirty percent of the cross-sectioasnal area of the main flow channel is impeded. In some embodiments, when the flapper is opened to allow a maximum flow rate, no more than fifty percent of the cross-sectional area of the main flow channel is impeded.

A pressure below the flapper will tend to push the flapper more firmly against the flapper seat 18, further sealing the flapper against the seat and further restricting or blocking passage of fluid past the flapper. Generally, unless noted to the contrary, discussions of pressures on one side or another of the valve 10, the flapper 16, or other component refers to a net pressure or force.

Preferably, a minimal downward pressure is required to open the flapper and permit a downward flow of fluid into the drain conduit 60. In some embodiments, 100 grams of fluid on the flapper can provide the minimum amount of force needed to move the flapper to an open position. In some embodiments, 25 grams, 50 grams, or 75 grams of fluid on the flapper can provide the minimum amount of force needed to move the flapper to an open position. In some embodiments, 2 ounces of water can be a sufficient amount of water on the flapper to move the flapper to an open position. In some embodiments, 4 ounces of water can be a sufficient amount of water on the flapper to move the flapper to an open position. In some embodiments, because it opens from a single side, a flapper valve can open more easily under water pressure than other valve types, such as umbrella valves. This is because as the flapper starts to swing open, the water accumulates on the opening area, creating a greater opening force.

Preferably, in addition to or independent of opening with a minimum pressure or force, various valves described herein can also open sufficiently to allow a minimum desired flow rate. For example, in some embodiments, valves described herein can open sufficiently to allow minimum flow rates according to required standards, such as the American Society of Sanitary Engineering (ASSE) Standard #1072-2007 approved Sep. 19, 2007. Thus, in some embodiments valves described herein can be configured to allow a flow rate of at least 6 gallons per minute on floor drains with a diameter of approximately 1.5 inches; a flow rate of at least 12 gallons per minute on floor drains with a diameter of approximately 2 inches; a flow rate of at least 34 gallons per minute on floor drains with a diameter of approximately 3 inches; a flow rate of at least 73 gallons per minute on floor drains with a diameter of approximately 4 inches; a flow rate of at least 132 gallons per minute on floor drains with a diameter of approximately 5 inches; a flow rate of at least 215 gallons per minute on floor drains with a diameter of approximately 6 inches.

In some embodiments, too much pressure below the flapper may not be desirable. Because greater pressure seals the flapper 16 more tightly against the flapper seat 18, it can require a greater pressure above the flapper to cause the flapper to open and allow fluid to drain. Thus, in some embodiments it may be desirable to allow for pressure that accumulates in a drainage or plumbing system and against a bottom side of the flapper to release. In some embodiments, a floor drain valve 10 can include a pressure relief conduit 34 extending from an area below the flapper 16 to an area above the flapper. The fluid relief conduit can allow for equalization of pressures on either side of the flapper, such that the amount of pressure above the flapper required for it to open remains generally constant. This is described in more detail below.

Figure 3:
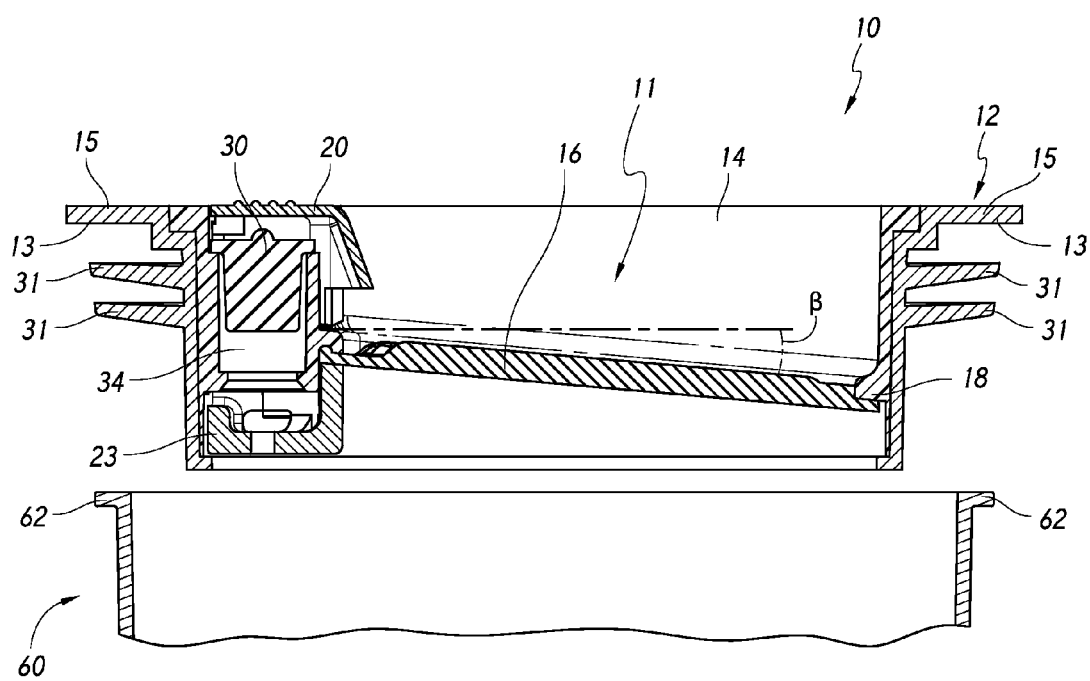
FIG. 3 illustrates a cross sectional view of one embodiment of a drain valve with a pressure relief conduit.

FIG. 3 illustrates one embodiment of a floor drain valve 10 that includes a pressure relief conduit 34. In some embodiments, as illustrated, the pressure relief conduit can be included as part of the housing 14 and can be offset from the flapper (or other valve element). For example, in the embodiment of FIG. 3, pressure relief conduit 34 extends at least partially along a lateral side of the flapper valve 16 and/or to a side of the main flow channel 11. In some embodiments, the pressure relief conduit can be included as part of the flapper and/or pass directly through the flapper. Preferably, a valve is included within the pressure relief conduit 34. This can help ensure that odors or other gases below the flapper valve 16 do not regularly mix with gases above the flapper valve 16, and that fluids only flow through the pressure relief conduit from below the flapper to above the flapper when there is a sufficient desired pressure differential.

In various embodiments, different types of valves and valve actuation systems can be used. In the illustrated embodiment of FIG. 3, the pressure relief conduit 34 can include a valve member 30 that is biased into a closed position by gravity. When the valve member is in a closed position it can restrict or block passage of fluid past the valve member. When a sufficient pressure accumulates below the flapper, the valve member 30 can be raised by the pressure, permitting an amount of gas to flow from the area below the flapper 16 to the area above the flapper until the pressure drops sufficiently for the valve member to fall back down and seal. The valve member 30 can be sized and configured to open at different pressures. In some embodiments, it can be configured to open at minimal pressure to help ensure that the region above the flapper 16 is generally in equilibrium with the region below the flapper. In some embodiments, the valve member 30 can be configured to open at a defined pressure differential greater than zero. Other types of valves that can be used include electronically actuated valves that open and/or close when a pressure sensor determines a defined pressure below the flapper 16 and/or other types of valves that may not require electronic actuation, such as, for example, ball valves, check valves, flapper valves, slit valves, duckbill valves etc.

As shown in FIG. 3, In some embodiments, a shield 20 can be positioned to cover the pressure relief conduit 34. In some embodiments, the shield 20 can be connected to the housing 14. The shield 20 can be used to prevent liquid that flows into the housing from flowing into the relief conduit 34 and/or onto the valve member 30. This can keep the relief conduit full of air, which can help ensure that the valve member 30 can open as necessary. It can also generally protect the valve member 30 and the conduit 34 from a downward flow of liquid and debris whenever the flapper 16 is opened by the presence of liquid above the flapper 16.

With further reference to FIG. 3, the drain valve 10 is illustrated in a position to be installed into a drain conduit 60. In this embodiment of use, the drain conduit can be a vertical drain conduit, such as, for example, a floor drain, which may include a trap (not shown). A gasket 12 around the housing 14 of the drain valve can be configured to help orient and/or seal the drain valve with the drain conduit. For example, in some embodiments the gasket can include an upper flange 15 that has a lower surface 13 configured to engage an upper surface 62 of the drain conduit to help seat the drain valve 10 in the drain conduit. In some embodiments, the gasket can include one or more sealing projections 31. The diameter of the gasket at one or more of the sealing projections can be configured to be wider than a diameter of the drain conduit 60, such that as the drain valve 10 is thrust downwardly into the drain conduit 60 the sealing projections will deflect upwardly and apply a lateral pressure against the drain conduit to help seat and/or seal the drain valve in position. In some embodiments, a gasket can have multiple sealing projections of varying length to help ensure that the gasket can fit and seal within various drain conduit configurations encountered in the field. In some embodiments, the projections 31 can increase in length toward a top of the gasket 12. In some embodiments, in addition to or instead of sealing projections, a gasket can include an inflatable structure on an exterior of the gasket that can be inflated to secure the gasket in position. This is illustrated and described in FIG. 11, below.

In some embodiments, the gasket 12 and housing 14 can be installed separately. For example, in some instances, the drain conduit into which a drain valve is to be installed can include a permanently installed strainer mount having an inside diameter that is too small for the gasket to fit through. In such instances, the drain valve may be installed by separating the gasket 12 from the housing 14. The gasket 12 can be compressed into an oval shape or other narrowing shape, inserted through the strainer mount (once the strainer has been removed) and placed into its operative position within the drain conduit. The housing 14 can then be inserted through the strainer mount into engagement with the gasket 12 in its operative position within the drain conduit. The strainer can then be returned into position within the strainer mount. This method permits installation of drain valves into drain systems for which the drain valve otherwise would not have been able to be used.

Other installation methods and structures are considered. For example, in some embodiments, rather than or in addition to using a gasket, an outer housing or shell can be installed in a drain conduit and the drain valve 10 can be inserted into the outer housing or shell. In some embodiments, the outer housing or shell can be glued or screwed into the drain valve. In some embodiments, the outer housing or shell can have internal threading and the housing 14 of the drain valve can have external threading configured to mate with the threading of the outer housing or shell. In some embodiments, the outer housing or shell can be sized and configured to sealingly retain the drain valve housing 14 without a threaded connection.

In some embodiments, it can be desirable to provide a valve in the pressure relief conduit 34 that closes when a pressure differential between the area above the flapper 16 and below the flapper exceeds a certain value. This can be useful, for example, where a sewer system is tied to a storm system. In such instances, during a storm event that floods the storm and sewer systems, high pressure fluids could bypass the flapper valve and flow up through the pressure relief conduit. A valve that closes when a pressure differential exceeds a certain value can also be useful in allowing for back pressure testing, such as of downstream drain conduits, without having fluids flow up through the pressure relief conduit 34 and without having to remove the valve and insert a plug.

Figure 4:
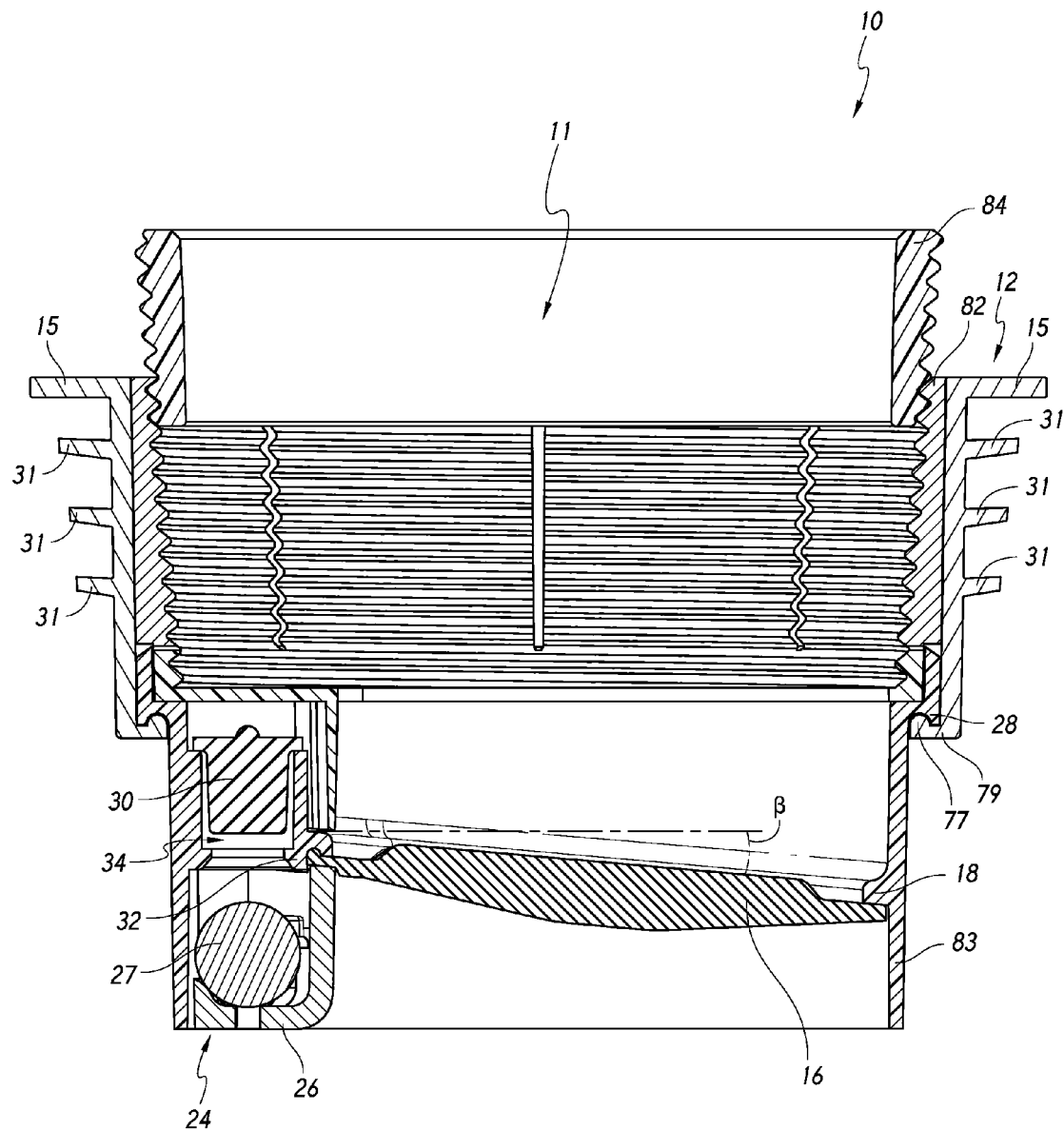
FIG. 4 illustrates a cross sectional view of one embodiment of a drain valve with a pressure relief conduit and a backflow valve.

In some embodiments, a ball valve 24 can be used to prevent high-pressure flows from passing upward through the pressure relief valve. FIG. 4 illustrates a cross sectional view of one embodiment of a floor drain valve 10 that includes a ball valve 24 in the pressure relief conduit 34. Many of the aspects of the embodiment of FIG. 4 can be the same as aspects of the valve discussed with respect to FIG. 3, and where not described herein similar numbering can be considered to refer to similar features with similar functions. The ball valve 24 can include a ball valve seat 32 at an upper end of the ball valve and a ball retainer 26 positioned at the bottom of the conduit, below the flapper. In some embodiments, the ball retainer can be part of a mounting clip as described herein. The ball retainer 26 is designed to retain a ball 27. The ball valve as illustrated is in an open position that allows fluid to flow past the ball. When the ball valve 24 experiences sufficient pressure beneath the valve, the pressure can drive the ball upward into sealing engagement with the ball valve seat 32 and into a closed position, thereby restricting or blocking passage of fluids through the pressure relief conduit. In some embodiments, the ball 27 can be configured to float, such that it rises in water. Thus, in some embodiments, when the ball valve 24 experiences a pressure beneath the valve or a rise of liquid, the pressure or liquid can drive the ball upward into sealing engagement with the ball valve seat 32, thereby blocking or substantially blocking passage of fluids through the pressure relief conduit.

In some embodiments, as illustrated, a ball valve can be used with a valve member 30 to both allow for equalization of pressure on opposite sides of the flapper 16 and to stop backflow during high pressure events. In some embodiments, a single valve can be used to allow for pressure equalization and to stop upward flow during high pressure events. For example, in some embodiments a ball valve can be configured to close during high flow events, as described above, but can also be configured to seal against a ball valve seat at a lower end of the ball valve when no pressure differential exists, such that the ball valve is only open during a range of pressure differentials between the area above the flapper 16 and the area below the flapper. In certain embodiments, the ball valve can be positioned above the flapper valve. In certain embodiments, the ball valve can be replaced with another form of check valve such as, for example, a flapper valve.

FIG. 4 also illustrates an embodiment of a floor drain valve 10 in which the valve includes an expansion ring, such as a bushing 84, that can be used to expand the housing into tightened engagement with a drain. In various embodiments, a bushing such as the bushing 84 can be used with drain valves of various designs. Thus, for example, in some embodiments a bushing can be used with the floor drain valve 10 as illustrated. In some embodiments, a bushing may be used with a floor drain valve that does not have a pressure relief conduit 34. In some embodiments, a bushing may be used with a valve used in locations beyond a floor drain, such as in vents in or on buildings as part of a heating, ventilation, air conditioning, and/or refrigeration system for the building, Various embodiments of bushings 84 are described in more detail below.

FIG. 4 also illustrates an embodiment of a floor drain valve 10 in which a housing 14 extends below the gasket 12. In some embodiments, the housing 14 can have a generally tapered outer profile to help prevent the valve 10 from becoming lodged within the drain 60. In some embodiments, a housing can be elongated to provide room for a pressure relief conduit 34 with a ball valve or to provide an extended length pressure relief conduit.

In some embodiments, a gasket and housing can include features configured to help position and/or seal the gasket in the housing to prevent fluid from passing between the two. For example, in some embodiments, a housing can have a cutout that receives a corresponding protrusion of the gasket. In some embodiments, such as illustrated in FIG. 4, a housing can have a downward facing ledge 28 on its outer surface that can be configured to receive a section of a gasket 12, such as a lower flange or shelf 79, to help position the gasket around the housing 14. This can help cause fluid pressure below the housing to tighten a seal between the gasket and the housing.

In some embodiments, a gasket can include an O-ring 77, which can be a separate component or integrally molded with the gasket. The O-ring can help provide a seal between the gasket and the housing 14. Additionally, insertion of the gasket into a floor drain conduit 60 can frequently place an upward force on the gasket, which can further improve the seal between the gasket and the housing. In some embodiments, the O-ring can be configured to at least partially fit within a corresponding channel in the downward facing ledge 28 of the housing 14. In some embodiments an O-ring can be positioned between the gasket and a side of the housing. In some embodiments, multiple O-rings can be used.

In some embodiments, a housing 14 can have one or more ridges or other feature on an outer surface thereof to help create zones of greater pressure between a gasket 12 and the housing. This can help provide or improve a seal between the gasket and the housing.

Figure 5:
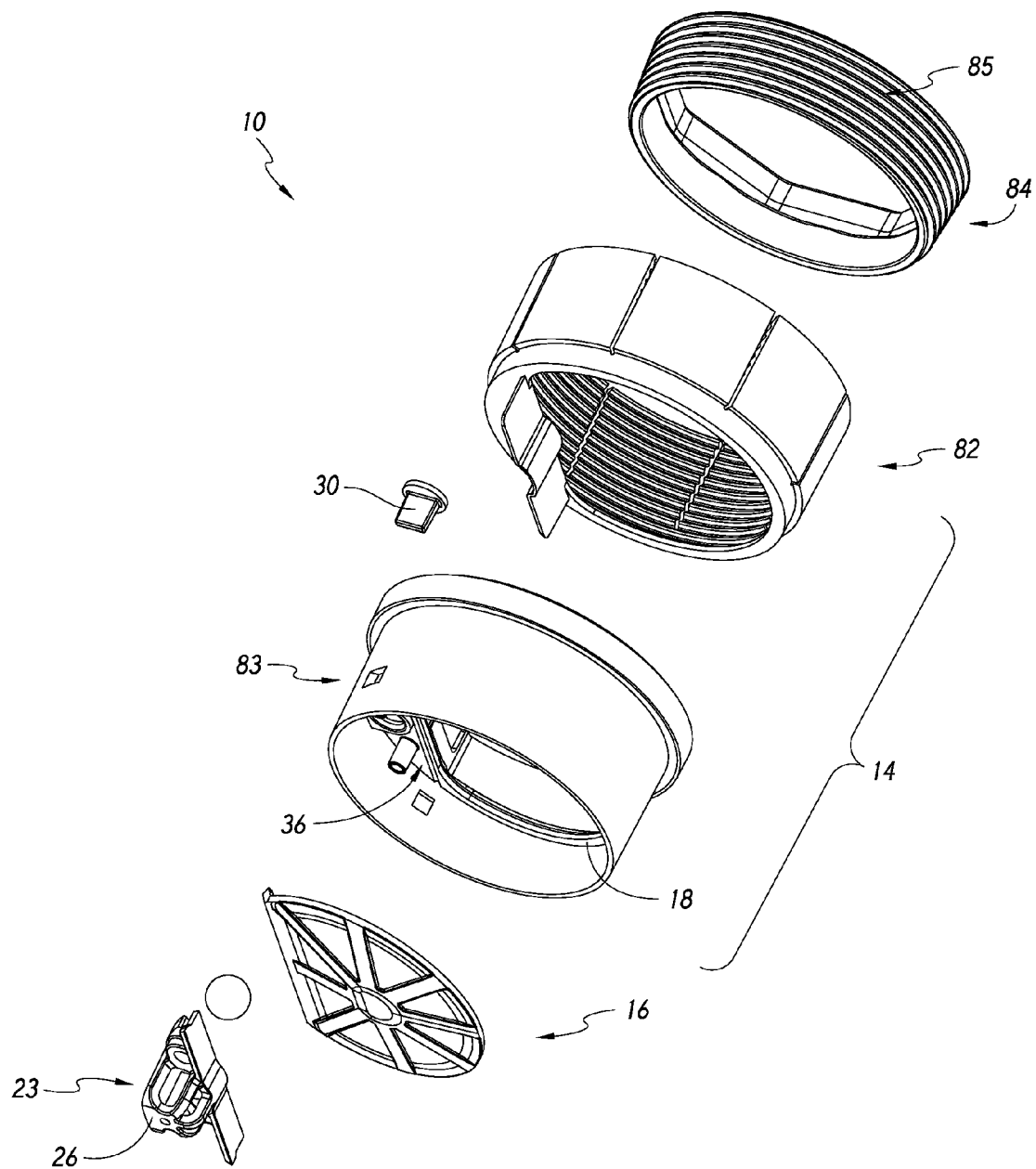
FIG. 5 is an exploded perspective view of the drain valve of FIG. 5.

FIG. 5 is an exploded view of the floor drain valve 10 of FIG. 4. FIG. 5 helps illustrate how many of the components of a valve can be aligned and assembled. For example, in some embodiments the housing 14 can include a separable upper portion 82 and a lower portion 83. A lower portion 83 can include a mount 36 configured to receive an attachment portion of a flapper 16 (described in more detail below). A support plate or clip 23 can be configured to attach to the mount 36 once the flapper has been positioned on the mount to thereby brace the flapper into position. In some embodiments, a support plate or clip can include a ball retainer 26 of a ball valve. In some embodiments, the upper portion 82 can be disconnected from the lower portion 83 and inserted into a drain above the lower portion to block the lower portion from being pushed out by water pressure below the lower portion.

Figure 6A:
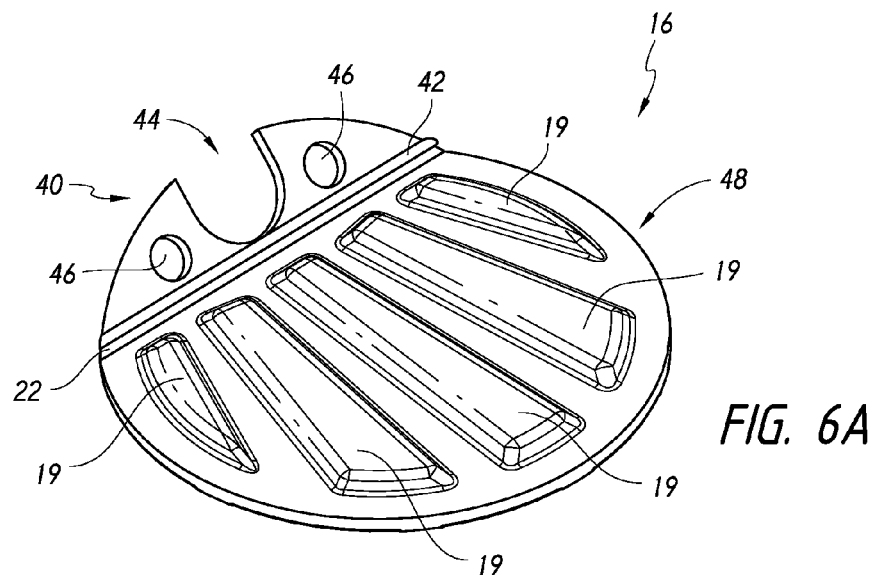
FIGS. 6A-6C are different views of one embodiment of a flapper.
Figure 6B:
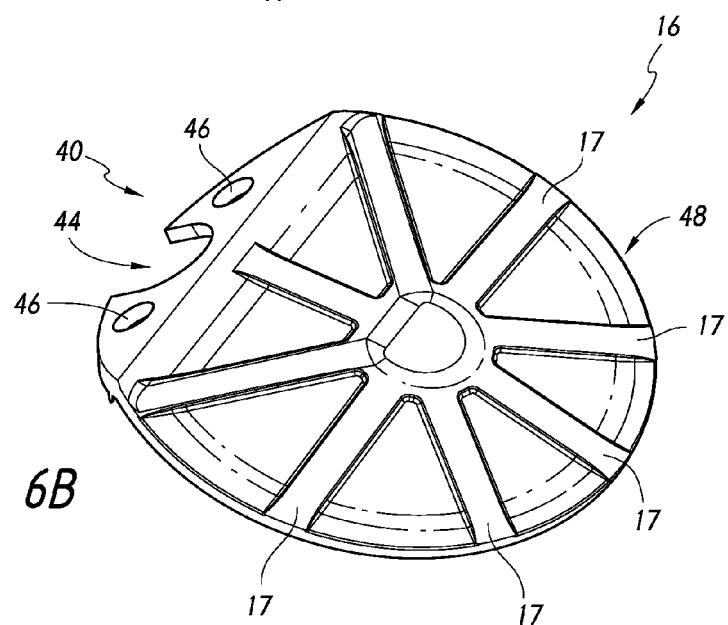
Figure 6C:
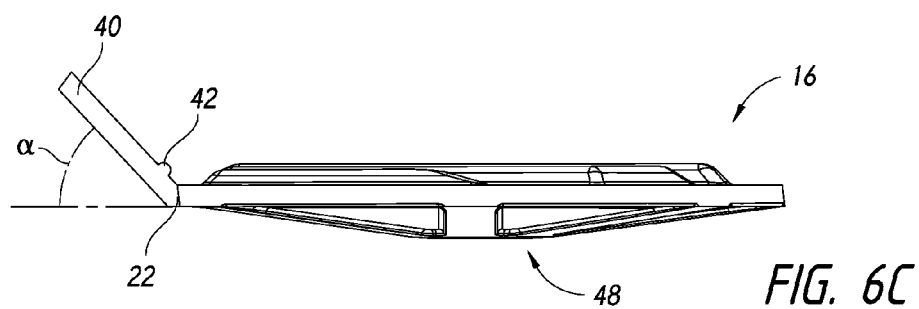

FIGS. 6A-6C illustrate one embodiment of a flapper 16. FIG. 6A illustrates a top perspective view of the flapper, FIG. 6B illustrates a bottom perspective view of the flapper, and FIG. 6C illustrates a side view of the flapper. As illustrated, in some embodiments the flapper can include a sealing portion 48 and an attachment portion 40. The sealing portion can engage and seal against a flapper seat 18, as described above. The attachment portion can be used to position the flapper 16 in a floor drain valve 10, as described in more detail below. The sealing and attachment portions of the flapper can be joined by a flapper hinge 22. Preferably, the flapper is formed as a single, unitary component, although in some embodiments the sealing and attachment portions can be formed separately and joined by a hinge 22. In some embodiments where the flapper is not monolithic, the sealing portion, the attachment portion, and/or the hinge can be formed of different materials. In some embodiments, for example, the hinge could be metallic and the sealing and attachment portions could be elastomeric.

In some embodiments, the sealing portion 48 of the flapper 16 can include one or more ridges, embossments, beams, or supports 19 on an upper side of the flapper. The flapper can also have one or more supports 17 on a bottom side of the flapper. The supports can provide additional structural integrity for the flapper so that it can help retain its shape and retain a seal when the area below the flapper is pressurized. In some embodiments, the flapper can have a convex profile on its lower side, as visible in FIG. 6C, to help resist deformation from pressure beneath the flapper. Preferably, the flapper has an equilibrium position, as illustrated, in which the sealing portion 48 and attachment portion 40 are at an angle $\alpha$ relative to each other. This can help bias the flapper toward a closed position, as described in more detail below. In some embodiments, the angle $\alpha$ can vary between approximately 10 degrees and approximately 70 degrees. In some embodiments it can vary between approximately 20 degrees and approximately 60 degrees. In some embodiments it can vary between approximately 30 degree and 55 degrees. In some embodiments it can be approximately 45 degrees.

In some embodiments, when the flapper 16 is positioned in a valve, such as illustrated in FIG. 3 and FIG. 4, it can be configured and arranged to pivot around a resilient hinge 22 into an open position to allow liquid to flow freely from the inlet and through the outlet of the housing 14. The flapper can be disposed at an angle $\beta$ within the housing 14, such that the attachment portion 40 of the flapper is positioned closer to the inlet, and the sealing portion 48 of the flapper is positioned closer to the outlet. As depicted in FIG. 4, for example, the sealing portion 48 of the flapper 16 is positioned below the attachment portion of the flapper. In some embodiments, the angle $\beta$ can vary between approximately 10 degrees and approximately 60 degrees. In some embodiments it can vary between approximately 20 degrees and approximately 50 degrees. In some embodiments it can vary between approximately 25 degree and 35 degrees. In some embodiments it can be approximately 30 degrees.

The attachment portion 40 of the flapper can be secured to or formed with a resilient flapper hinge 22. The resilient hinge biases the flapper upwardly into sealing relationship with the flapper seat 18. The downwardly angled arrangement of the flapper 16 within the housing 14 enables the flapper 16 to be easily opened (lowering the sealing end of the flapper from its normally closed position) due to water flow from the inlet to the outlet. The downwardly angled arrangement also prevents opening of the flapper due to gas flow from the outlet to the inlet.

The flapper can be made from a variety of materials, and is preferably made from an elastomeric material. In some embodiments the flapper is sufficiently rigid to resist back pressure but flexible. In some embodiments, the flapper can be constructed from a relatively rigid material, such as various types of polymer materials, EPDM rubber, neoprene, silicone, etc. In some embodiments, the flapper can be formed from a material having a durometer between about 30 to 90. In some embodiments, the flapper can be formed from a material having a durometer between about 40 to 60. Preferably, the flapper is formed of a material that is sufficiently rigid to resist back pressures on the flapper, but sufficiently flexible and resilient to allow the hinge 22 to rotate the flapper to and from the open and closed positions.

The attachment portion 40 of the flapper 16 can have a variety of features to help ensure alignment of the flapper within a valve 10 when installing the flapper and when the valve is in use. For example, in some embodiments the flapper can have one or more apertures 46 that can receive a post or projection to help position the flapper. In some embodiments, the apertures can be slots. The flapper can also include an indexing ridge 42, which can be positioned in a corresponding channel to help positively place and maintain the flapper in position. In some embodiments, the flapper can include a cutout 44, which can be used to fit the attachment portion 40 around components of a valve as necessary. For example, in some embodiments the cutout can be positioned around a pressure relief conduit 34. In some embodiments, the pressure relieve conduit 34 also extends between the apertures 46. These various features and their relationship to other parts of a valve are described in more detail below.

Figure 7A:
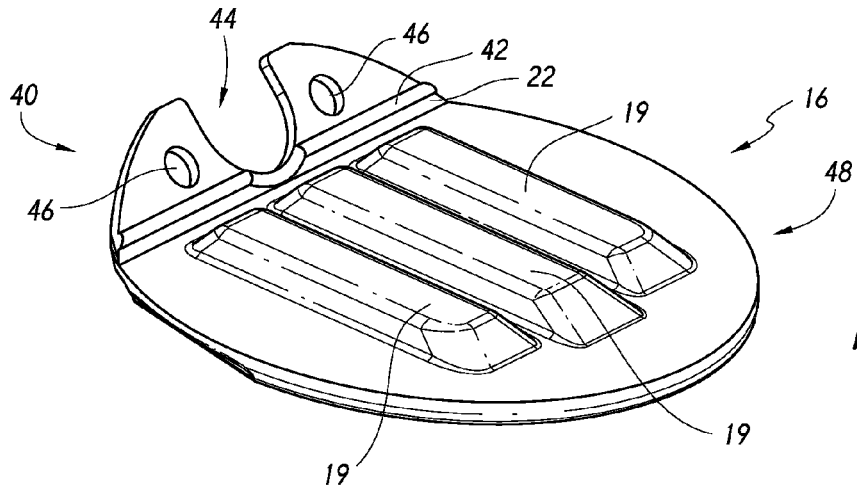
FIGS. 7A-7C are different views of one embodiment of a flapper.
Figure 7B:
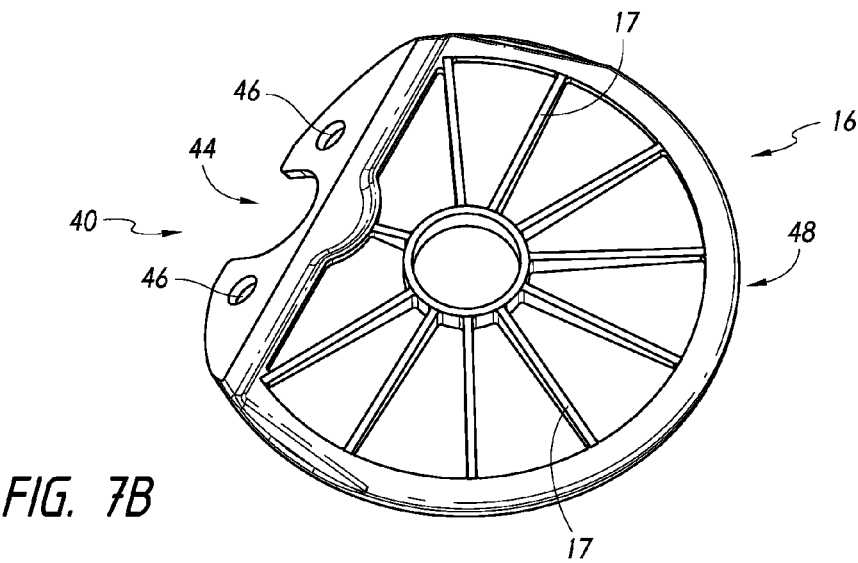
Figure 7C:
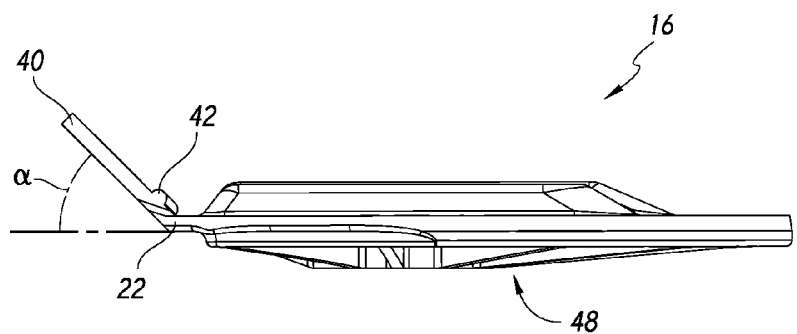

FIGS. 7A-7C illustrate an alternate embodiment of a flapper 16. FIG. 7A illustrates a top perspective view of the flapper, FIG. 7B illustrates a bottom perspective view of the flapper, and FIG. 7C illustrates a side view of the flapper. Many of the aspects can be the same as aspects of the flapper 16 discussed with respect to FIGS. 6A-6C, and where not described herein similar numbering can be considered to refer to similar features with similar functions. In some embodiments, a flapper can have varying numbers of supports 19. As illustrated in FIG. 7A, in some embodiments a flapper can have three supports 19. FIG. 7A also illustrates an embodiment of a flapper 16 in which a cutout 44 extends at least partially through the indexing ridge 42.

Although the flappers 16 are illustrated as generally round, they can have a variety of shapes. In some embodiments, for example, the flappers can be rectangular, circular, hexagonal, octagonal, or of other shapes. In some embodiments, the sealing portion 48, the attachment portion 40, and/or the hinge 22 can have multiple components. In some embodiments, for example, a flapper can include two substantially semicircular relatively rigid flapper elements positioned side-by-side and attached with a resilient hinge each at an upper end thereof to a diametrically positioned mounting structure. Each of the flapper elements can have a peripheral edge resiliently urged upwardly into sealing contact with a flapper seat 18 or a portion of a flapper seat. In some embodiments, a flapper can be a bi-valve, a duckbill valve, umbrella valve, or other type of one-way valve. In some embodiments, a flapper 16 can be formed of overlapping wedges.

Figure 8:
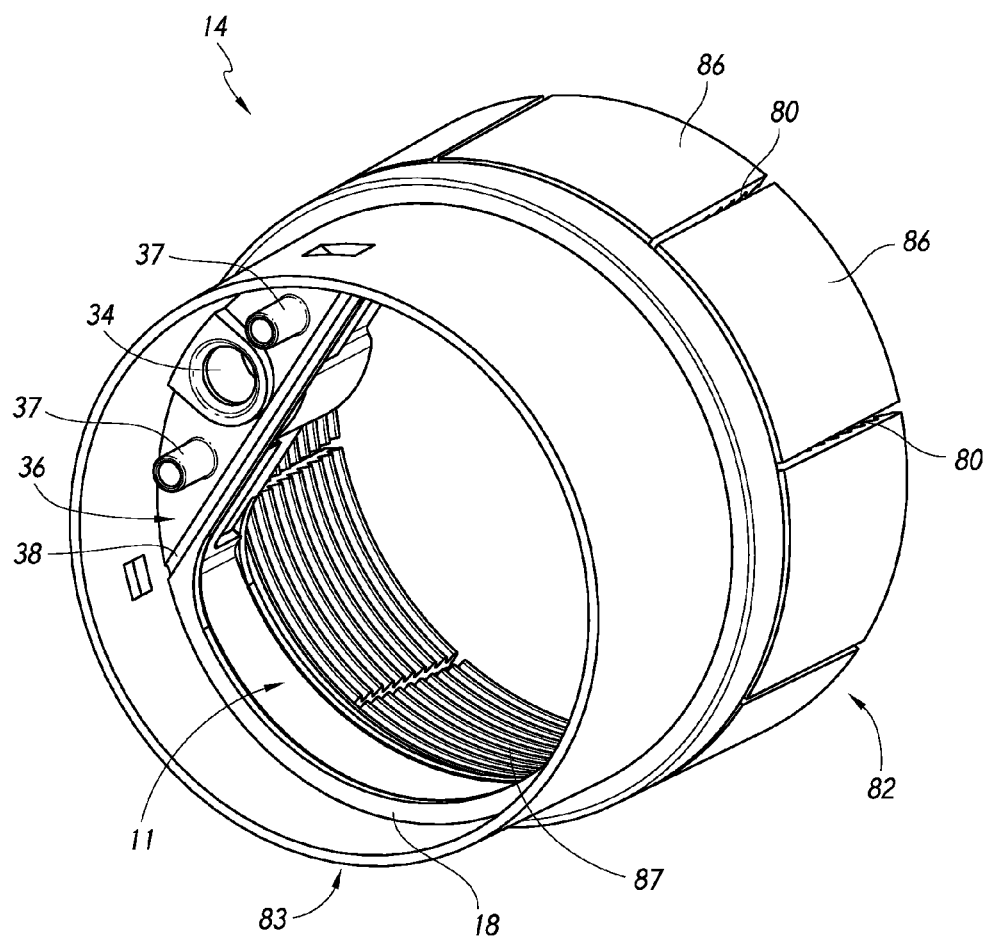
FIG. 8 is a bottom perspective view of a housing used with a drain valve.

FIG. 8 illustrates a bottom perspective view of a housing 14 of a valve 10. The housing can include a flapper mount 36 configured to receive the attachment portion 40 of a flapper. In some embodiments, a flapper mount can include one more projections 37 configured to pass through corresponding apertures or slots on a flapper to help retain the flapper in position. In some embodiments, a flapper mount can include an indexing channel 38 configured to receive a corresponding indexing ridge of a flapper. The indexing channel and indexing ridge can help properly align the flapper and also distribute forces exerted by back pressure upon the flapper to thereby help maintain the flapper in its position when sealed against a valve seat. In some embodiments, a housing 14 can include at least a portion of a pressure relief conduit 34, and the flapper can include a cutout, described above, configured to fit around the conduit. Accordingly, in the illustrated embodiment, the pressure relief conduit 34 can extend, at least partially, through the attachment portion 40 of the flapper valve 16 and/or on one side on the indexing ridge 42.

FIG. 8 also illustrates a flapper seat 18, against which a flapper 16 can seal when the flapper is in a closed position. Preferably, the flapper mount 36 is parallel with the plane of the flapper seat 18. In some embodiments, the flapper mount can be at an angle relative to the plane of the flapper seat, but the angle is preferably less than the angle between the attachment portion 40 and sealing portion 48 of a flapper configured for use with the housing. Thus, when the attachment portion is positioned on the flapper mount and held into place by a support plate or clip 23 (illustrated in FIG. 1B), and the flapper 16 tends toward its equilibrium position, the sealing portion 48 of the flapper can press against the flapper seat 18 to create a seal. In some embodiments, the flapper can be configured such that the seal is of varying strength, depending on the desired properties of the drain valve 10. In other words, in various embodiments the flapper can be configured to be biased toward its equilibrium position with varying degrees of force when against the flapper seat. In some embodiments, the flapper can be configured such that the sealing portion 48 of the flapper is aligned with the flapper seat 18 when the flapper is in an equilibrium position (such that the flapper experiences no biasing force when it is against the flapper seat), and no seal is created between the flapper and the flapper seat until the flapper experiences a pressure on its bottom side.

The seal between the flapper 16 and the flapper seat 18 can help prevent the flow of noxious gases below the flapper from flowing past the flapper. The seal can also help prevent fluid from flowing upward, such as during a storm event or during back pressure testing. If the flapper is expected to withstand particularly high pressure events, it can be made thicker or with additional supports 17, 19 to help make sure that the flapper does not buckle against the pressure. When liquid flows upon the upper surface of the flapper 16, however, the pressure of the liquid can cause the flapper to angle away from the flapper seat 18 to thereby open the valve 10, permitting passage of the liquid. Once the liquid flows past, the resilient hinge 22 can return the flapper toward its equilibrium position, which can include resealing the flapper against the flapper seat.

In some embodiments, the housing 14 can have various features configured to allow the housing to expand outward to seal the housing against a gasket surrounding the housing, to help seal the gasket against a drain conduit 60, and/or to help seal the housing against a drain conduit. Outward expansion of the housing can also help the housing and/or gasket engage the drain conduit so that the drain valve 10 is not forced upwardly from pressure below it, such as in embodiments in which a drain valve is designed to withstand back pressures (e.g., during back pressure testing). In some embodiments, for example, an upper section 82 of the housing 14 can include a plurality of expandable sections 86 separated by slots 80. An insert can be inserted into the upper section which can expand the expandable sections 86 outward, which can in turn press against a gasket surrounding the housing. In some embodiments, the upper section 82 can have internal threading 87, and an insert can be a bushing. In some embodiments, the housing 14 can be a single piece or component, and in some embodiments the housing can be formed of multiple, connected pieces.

Figure 9A:
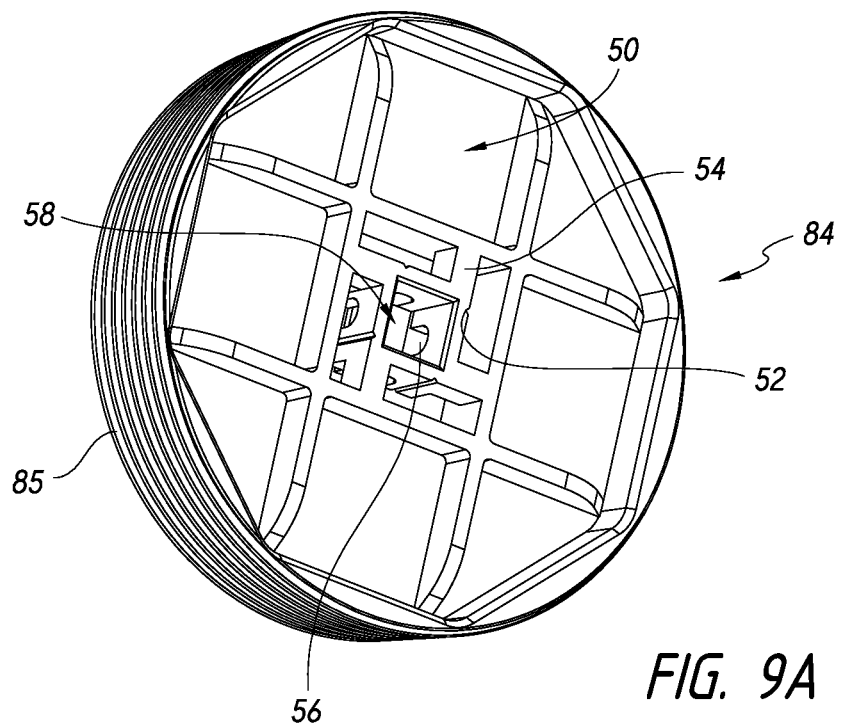
FIG. 9A is a top perspective view of a bushing with an insertion tool.
Figure 9B:
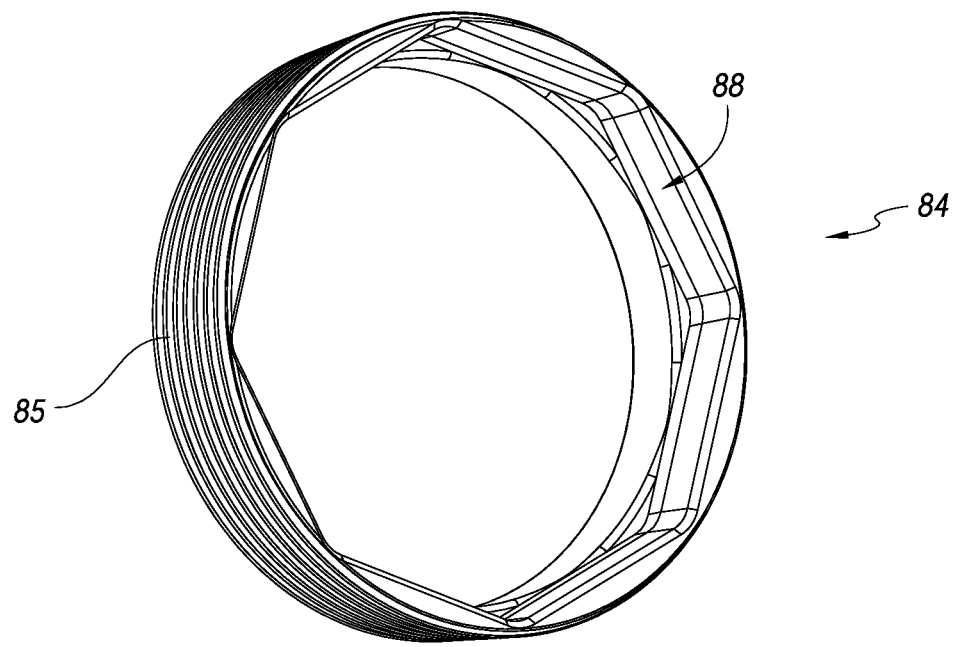
FIG. 9B is a top perspective view of the bushing of FIG. 10A without the insertion tool.

FIGS. 9A-9B illustrate one embodiment of a bushing 84 that can be inserted within an upper section 82 of the housing 14 and expand the housing. As discussed above, in various embodiments a bushing such as the bushing 84 can be used to expand a housing in valves of various designs, including valves with or without fluid relief conduits and/or valves for use with floor drains or for other applications. The bushing can have external threading 85 that can be configured to couple with the internal threading 87 of the housing. In some embodiments, the threading of the bushing 84 and/or the internal threading 87 of the housing can be tapered so that upon threading bushing 84 farther into the upper portion 82 of the housing, the segments 86 are forced farther outward to further tighten the drain valve 10 into position within a drain conduit 60. In some embodiments, an outer diameter of at least a section of the bushing can increase from a bottom of the section to a top of the section. In some embodiments, an inner diameter of at least a portion of the housing can decrease from a bottom of the portion to a top of the portion. These differences can help cause the segments 86 to expand outward as the bushing is moved into the housing.

In some embodiments, the bushing 84 can include a section 88 with a non-circular internal profile. This section can be used to receive a tool, such as the tool 50 shown in FIG. 9A, to help tighten or loosen the bushing within the housing 14. In some embodiments, the tool 50 can be a single use tool that is sold attached to the bushing 84. The tool can be frangible and can be configured to break at a desired level of torque. Thus, the tool can be rotated to tighten the bushing into the housing until the desired level of torque is reached, at which point the tool can break. In some embodiments, the tool 50 can be tightened with a driver, such as a ½ inch square driver, that can be inserted into an opening 58 of the tool 50, which in some embodiments can be at the center of the tool. In some embodiments, other connections are possible between the tool and a driver.

Figure 9C:
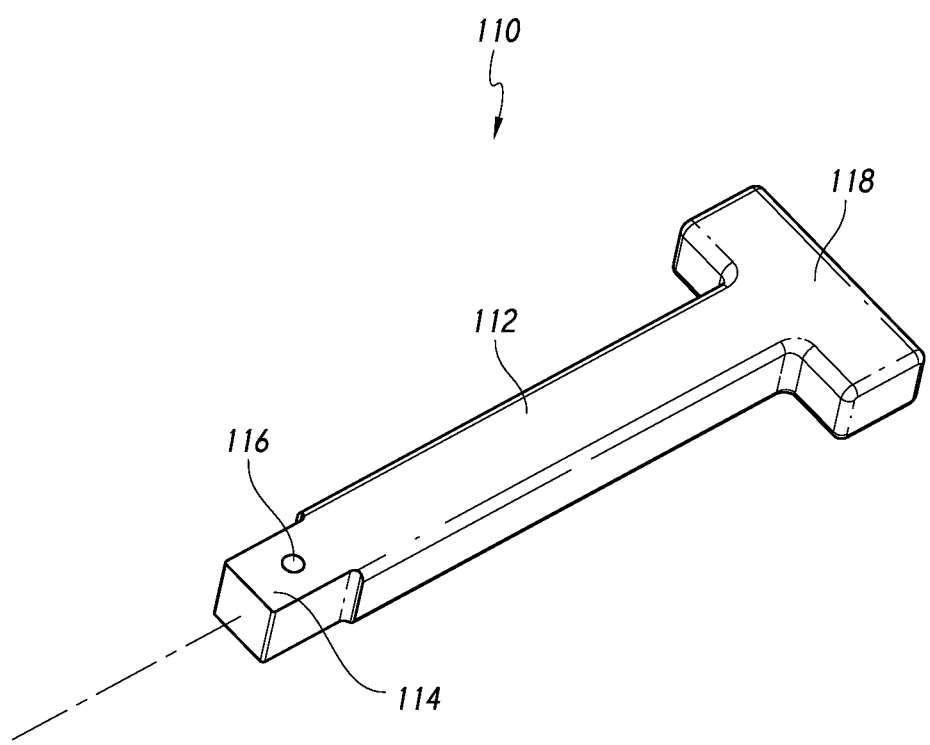
FIG. 9C is a perspective view of one embodiment of a driver.

FIG. 9C illustrates one embodiment of a driver 110. A driver preferably includes an insertion portion 114 sized to fit within the opening 58 of the tool 50. The insertion portion can have a variety of cross-sectional profiles, which preferably match a cross-sectional profile of the opening 58 of the tool. For example, in some embodiments, the cross-sectional profile of the insertion portion can be square, hexagonal, octagonal, or of other shapes. Preferably, the cross-sectional profile of the insertion portion is symmetrical to facilitate insertion into the tool 50, but in some embodiments it may be desirable for the insertion portion to have a cross-sectional profile that is not symmetrical and/or that allows the driver to be inserted into the tool 50 in only a single orientation.

In some embodiments, the driver can include a main body 112 that is sized and/or shaped differently from an insertion portion 114. Where the main body is larger, it can provide additional strength to the driver and help prevent the driver from being inserted too far into or through the tool. In some embodiments, a driver 110 can include one or more protrusions or detents 116 that can fit within a recess 56 within the opening 58. This can help properly align the driver and retain it in position. In some embodiments, the detent 116 can be spring biased outward and can be retracted inward for easier insertion of the driver. In some embodiments, the driver can also include a handle 118 for easier gripping and turning of the driver.

In some embodiments, the size/shape of the insertion portion 114 and/or the detent 116 can help create a pressure fit between the insertion portion 114 and the opening 58 of the tool 50 such that the tool will not slide or otherwise move off of the driver 110 without application of a force. In some embodiments, the combined weight of a bushing 84 and tool will not remove the tool from the driver. This can make it easier to insert a bushing 84 during installation of a floor drain valve. For example, when the tool is attached to a bushing, in some embodiments an installer can hold the tool and lower the bushing into position within a housing 14 without having to insert his or her hand into the drain. In certain embodiments, other mechanisms can be used to couple driver to the tool and/or other tools and mechanisms can be used. Other mechanisms e.g., cams, springs, etc. can be used to expand the bushing in modified embodiments.

With further reference to FIG. 9A, the tool 50 can include frangible portions 52 that can include a notch, cut, or other weakening to allow the material of the tool to break. In various embodiments, the tool can be formed of a rigid material, such as plastic, ceramic, or other material. Preferably, the frangible portions 52 are positioned to receive a force from the driver 110 as the tool is used to tighten the bushing 84 within a housing. When sufficient torque is applied, the frangible portions will break and prevent or limit the driver from tightening the tool 50 further. In some embodiments, the frangible portions can be designed to break at a desired level of torque.

In addition to the frangible portions 52, in some embodiments the tool 50 can also include loosening portions 54 that can be aligned with an edge or surface of the driver 110 that is used to loosen the tool 50. The loosening portions 54 preferably remain in place even once the frangible portions 52 have broken, thereby allowing the driver to still be used to loosen the bushing 84 and remove the bushing from the housing 14. In some embodiments, a tool 50 can include a frangible portion 52 and a loosening portion 54 that align with each face of a driver 110.

In some embodiments, a bushing 84 and expandable housing can be separate from a floor drain valve 10 or other valve. The bushing and expandable housing can be positioned within a drain above the valve and can still help prevent the valve from backing out of the drain when it is subject to back pressure. Other types of locking devices and systems can be used with and/or as part of the floor drain valve.

Figure 10A:
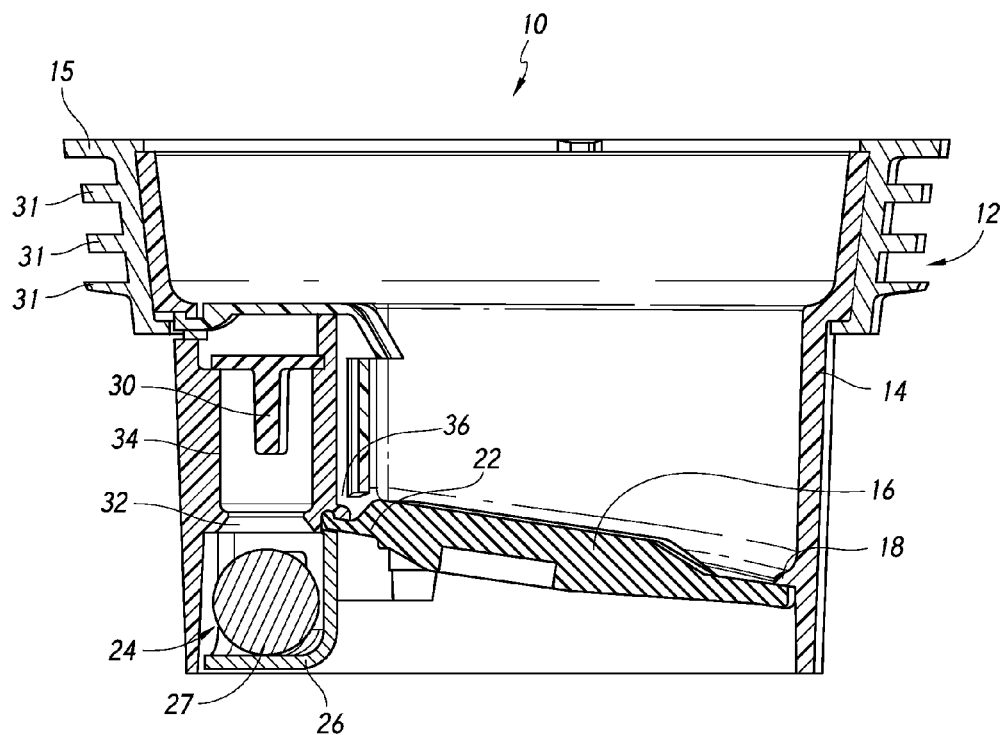
FIG. 10A illustrates a cross sectional view of one embodiment of a drain valve with a pressure relief conduit and a backflow valve.

FIG. 10A illustrates a cross sectional view of one embodiment of a drain valve 10 showing the presence of a ball valve 24 in a pressure relief conduit 34. The ball valve 24 can have a ball valve seat 32 and a ball retainer 26 positioned at the bottom of the conduit, below the flapper. The ball retainer 26 is designed to retain a ball 27. The ball valve 24 is configured to resist backward pressure and flow of fluids to test the downstream area for leakage. The ball valve 24 is closed by the presence of backward flow of water or sufficient amount of air for testing and permits back pressure testing of the downstream drain conduits.

The flapper 16 is constructed of a relatively rigid material such as various types of plastics well known in the art and is mounted with the elastomeric hinge 22. The ball valve 24 which is normally in an open position rises to engage with the ball valve seat 32 and closes the pressure equalization conduit 34 when fluid flows upward thereby sealing the floor drain valve to prevent the flow of fluid in a reverse direction. When the fluids push upwardly against the flapper 16, it presses against the flapper seat 18 and forms a tight seal to prevent the fluid from moving upwardly past the flapper 16. Thus, whenever water flows upon the upper surface of the flapper 16, the flapper 16 opens permitting passage of the water, and then reseal resiliently against the flapper seat 18 to prevent gases from the downstream drain conduits from passing upwardly past the flapper 16, permitting pressure testing of the downstream drain conduits. Thus, this embodiment permits the flow drain valve to provide dual functions such as preventing backflow of gases and pressure testing the downstream drain conduits.

The outer housing 12 together with gasket 12 provides multiple positioning rings and sealing rings that are contemplated to fit in the various drain conduit configurations encountered in the field.

Figure 10B:
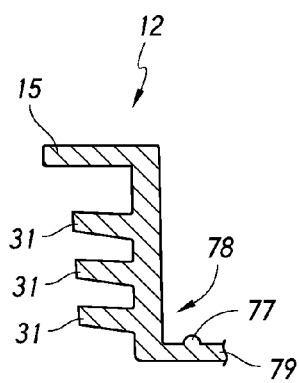
FIG. 10B illustrates a cross section of a portion of a gasket.

In FIG. 10B there is shown a partial cross section of the gasket structure utilized in the drain valve body within a drain conduit. Shelf 15 can be used to locate the gasket 12 upon a horizontal surface (not shown) of the drain conduit. At the lower zone 78 of gasket 12 a shelf 79 is provided, to receive a corresponding surface of the valve body 10, and to provide additional sealing mechanisms, such as by integrally molded "O" ring 77. Upwardly directed pressure causes shelf 79 to seal against the horizontal surface of the drain conduit.

Figure 11:
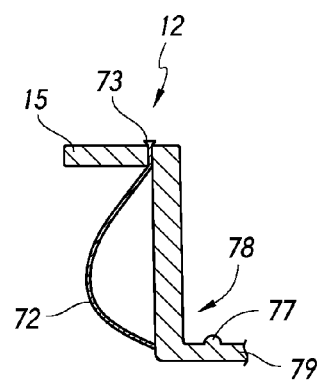
FIG. 11 illustrates a cross section of a portion of a gasket.

FIG. 11 shows a partial cross section of one embodiment of a gasket structure that includes an inflatable membrane 72 that can be used to secure the gasket (and drain valve 10) into position within a drain. In some embodiments, an inflation valve 73 of the inflatable member can be accessible from the flange or shelf 15 of the gasket. The gasket can be inserted into the drain valve with the membrane deflated, and the membrane can be inflated to secure the gasket in position. To remove the gasket, the membrane can be deflated. In some embodiments, a gasket can include sealing projections in addition to an inflatable membrane. In some embodiments, an inflatable membrane can be included on a separate sealing structure positioned above the drain valve 10 and gasket 12 in order to help lock the drain valve within the drain.

Other locking devices and systems may be used, either as part of a gasket on a drain valve 10, connected to other parts of the drain valve 10, or as part of a device separate from the drain valve to lock in the drain above the drain valve and prevent the drain valve from backing out. For example, in some embodiments a snap lock, such as bale-and-gasket snap locks similar to those found on mason jars, can be used. Other examples include multi-layered locks comprising two relatively rigid layers with an elastomeric layer between them. Screws or other tightening or expanded mechanisms can join the rigid layers, and as the screws or other mechanisms are tightened to bring the rigid layers closer toward each other, the elastomeric layer will deform outward and seal against the drain.

The terms "approximately", "about", and "substantially" as used herein represent an amount or characteristic close to the stated amount or characteristic that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount or characteristic.

Additionally, the term "closed" when used with reference to a valve preventing or blocking passage of fluid through the valve is used broadly and includes its ordinary and customary meaning. In certain embodiments, it means allowing within less than 1% of, within less than 0.1% of, and/or within less than 0.01% of, and in certain embodiments 0% of the flow that would pass through the valve in the open position during anticipated operating conditions. In some embodiments, the term closed when used with reference to preventing passage of fluid through a valve means that the valve allows some fluid passage at lower pressures but completely blocks fluid passage above a minimum pressure. For example, in some embodiments it can mean completely blocking fluid passage above the minimum pressure of 0.2 psi, 0.5 psi, or 1.0 psi. In some embodiments, it can mean completely blocking fluid passage at pressures above the minimum pressures and up to a maximum pressure of at least 6 psi, 7 psi, 8 psi, or greater.

Although the foregoing description of the preferred embodiments has shown, described and pointed out the fundamental novel features of the inventions, it will be understood that various omissions, substitutions, and changes in the form of the detail of the apparatus as illustrated as well as the uses thereof, may be made by those skilled in the art, without departing from the spirit of the inventions.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments. For example, various embodiments of flapper valves described herein can be used with various housings, with embodiments that do not include a ball valve, with embodiments that do include a ball valve, etc. Similarly, as a further example, the various gasket embodiments (including gaskets with sealing projections and/or inflatable membranes) can be used with the various flapper and valve embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A floor drain valve comprising:
a drain valve housing configured to fit within a drain conduit, the drain valve housing including an inlet, an outlet, a circumferential valve seat, and a flow channel passing through the valve and through the valve seat;
a flapper mounted within the housing and having a first side facing a first side of the valve and a second side facing a second side of the valve, the flapper biased toward a closed position in which a sealing portion on the first side of the flapper engages with the valve seat to thereby block at least a portion of backflow through the flow channel, wherein the flapper is configured such that a minimum pressure on the first side of the flapper moves the flapper to an open position in which fluid can flow through the flow channel;
a pressure equalization conduit fluidly connecting a first side of the drain valve on the first side of the flapper with a second side of the drain valve on the second side of the flapper; and
a valve member within the pressure equalization conduit, the valve member configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve, the valve member being in a position that is protected from the flow of fluid passing through flow channel.

2. The floor drain valve of claim 1, wherein the minimum pressure on the first side of the flapper to move the flapper to an open position is the pressure exerted on the flapper by four ounces of water collected on the flapper.

3. The floor drain valve of claim 1, wherein the flapper is configured to rotate from the closed position to the open position about a single hinge on one radial side of the flow channel.

4. The floor drain valve of claim 1, further comprising a shield connected to the drain housing and configured to cover the pressure equalization conduit.

5. The floor drain valve of claim 1, wherein the drain valve housing is a monolithic housing.

6. The floor drain valve of claim 1, wherein the flapper comprises an attachment portion and the housing comprises a flapper mount configured to receive the attachment portion.

7. The floor drain valve of claim 6, wherein the flapper further comprises a resilient hinge connecting the attachment portion of the flapper and the sealing portion of the flapper, the resilient hinge biasing the flapper into the closed position.

8. The floor drain valve of claim 7, wherein the flapper is monolithically formed.

9. The floor drain valve of claim 1, wherein flow channel and the pressure equalization conduit are parallel to each other and laterally distanced from each other.

10. The floor drain valve of claim 1, further comprising a shield covering the pressure equalization conduit that diverts fluid away from the pressure equalization conduit and towards the flow channel.

11. A floor drain valve comprising:
a drain valve housing configured to fit within a drain conduit, the drain valve housing including an inlet, an outlet, a circumferential valve seat, and a flow channel passing through the valve and through the valve seat;
a flapper mounted within the housing and having a first side facing a first side of the valve and a second side facing a second side of the valve, the flapper biased toward a closed position in which a sealing portion on the first side of the flapper engages with the valve seat to thereby block at least a portion of backflow through the flow channel, wherein the flapper is configured such that a minimum pressure on the first side of the flapper moves the flapper to an open position in which fluid can flow through the flow channel;
a pressure equalization conduit fluidly connecting a first side of the drain valve on the first side of the flapper with a second side of the drain valve on the second side of the flapper;
a valve member within the pressure equalization conduit, the valve member configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve; and
a backflow valve in fluid communication with the pressure equalization conduit, the backflow valve configured to allow backflow of fluid through the pressure equalization conduit below a second defined pressure and to automatically substantially block backflow of fluid through the pressure equalization conduit above a second defined pressure, wherein the second defined pressure is greater than the first defined pressure.

12. The floor drain valve of claim 11, wherein the backflow valve is a ball valve.

13. The floor drain valve of claim 11, wherein flow channel and the pressure equalization conduit are parallel to each other and laterally distanced from each other.

14. The floor drain valve or claim 11, further comprising a shield covering the pressure equalization conduit that diverts fluid away from the pressure equalization conduit and towards the flow channel.

15. A floor drain valve comprising:
a drain valve housing comprising an inlet and an outlet;
a one way valve positioned within the drain valve housing, the one way valve configured to restrict backflow through a flow channel of the drain housing from a second side of the one way valve to a first side of the one way valve while allowing fluid to drain through the flow channel of the drain housing from the first side of the one way valve to the second side of the one way valve;
a pressure equalization conduit fluidly connecting the first side of the one way valve to the second side of one way valve, the pressure equalization conduit positioned independent of the flow channel; and
a valve member configured to move from a closed position that restricts fluid transfer through the pressure equalization conduit between the first and second sides of the one way valve to an open position when a pressure on the second side of the one way valve exceeds a first defined pressure, thereby allowing the pressure on the second side of the one way valve to bleed into the first side of the one way valve.

16. The floor drain valve of claim 15, wherein the one way valve comprises a sealing membrane.

17. The floor drain valve of claim 16, wherein the sealing membrane comprises a resilient hinge configured to bias the sealing membrane into a position to restrict backflow through the drain housing.

18. The floor drain valve of claim 17, wherein the sealing membrane is monolithic.

19. The floor drain valve of claim 15, wherein the drain valve housing is radially expandable to lock the drain valve within a floor drain.

20. The floor drain valve of claim 15, further comprising an expansion ring screwable into the drain valve housing to thereby radially expand the housing.

21. The floor drain valve of claim 15, wherein the one-way valve allows fluid to drain through the flow channel of the drain housing when the one-way valve is in an open position, and wherein the one-way valve has a maximum open position in which a maximum rate of fluid flow can pass through the flow channel.

22. The floor drain valve of claim 21, wherein the maximum rate of fluid flow is sufficient to satisfy the American Society of Sanitary Engineering Standard #1072-2007.

23. The floor drain valve of claim 21, wherein when the one-way valve is in the maximum open position no more than fifty percent of a cross-sectional area of the main flow channel is impeded.

24. The floor drain valve of claim 23, wherein when the one-way valve is in the maximum open position no more than ten percent of the cross-sectional area of the main flow channel is impeded.

25. The floor drain valve of claim 15, wherein flow channel and the pressure equalization conduit are parallel to each other and laterally distanced from each other.

26. The floor drain valve of claim 15, further comprising a shield covering the pressure equalization conduit that diverts fluid towards away from the pressure equalization channel and towards the flow channel.

27. A floor drain valve comprising:
a drain valve housing comprising an inlet and an outlet;
a one way valve positioned within the drain valve housing, the one way valve configured to restrict backflow through a flow channel of the drain housing from a second side of the one way valve to a first side of the one way valve while allowing fluid to drain through the flow channel of the drain housing from the first side of the one way valve to the second side of the one way valve;
a pressure equalization conduit fluidly connecting the first side of the one way valve to the second side of one way valve;
a shield covering the pressure equalization conduit that diverts fluid away from the pressure equalization channel and towards the flow channel; and
a valve member configured to move from a closed position that restricts fluid transfer through the pressure equalization conduit between the first and second sides of the one way valve to an open position when a pressure on the second side of the one way valve exceeds a first defined pressure, thereby allowing the pressure on the second side of the one way valve to bleed into the first side of the one way valve.

28. The floor drain valve of claim 27, wherein flow channel and the pressure equalization conduit are parallel to each other and laterally distanced from each other.

29. The floor drain valve of claim 27, wherein the one-way valve allows fluid to drain through the flow channel of the drain housing when the one-way valve is in an open position, and wherein the one-way valve has a maximum open position in which a maximum rate of fluid flow can pass through the flow channel and wherein the maximum rate of fluid flow is sufficient to satisfy the American Society of Sanitary Engineering Standard #1072-2007.

30. The floor drain valve of claim 27, wherein when the one-way valve is in the maximum open position no more than fifty percent of a cross-sectional area of the main flow channel is impeded.

* * * * *